(12) United States Patent
Nishihara et al.

(10) Patent No.: US 8,582,980 B2
(45) Date of Patent: Nov. 12, 2013

(54) OPTICAL DEVICE AND OPTICAL MODULATION METHOD

(75) Inventors: Masato Nishihara, Kawasaki (JP);
Tomoo Takahara, Kawasaki (JP);
Yuichi Akiyama, Kawasaki (JP);
Masahiro Yuki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1495 days.

(21) Appl. No.: 12/013,708

(22) Filed: Jan. 14, 2008

(65) Prior Publication Data

US 2008/0170864 A1    Jul. 17, 2008

(30) Foreign Application Priority Data

Jan. 15, 2007 (JP) .................................. 2007-006125

(51) Int. Cl.
*H04B 10/04* (2011.01)
(52) U.S. Cl.
USPC ............ 398/188; 398/183; 398/185; 398/198
(58) Field of Classification Search
USPC ........... 398/188, 183, 185, 198, 195; 359/279
See application file for complete search history.

(56) References Cited

U.S. PATENT DOCUMENTS

| | | | | |
|---|---|---|---|---|
| 7,330,666 B1* | 2/2008 | Koley | ............................ | 398/188 |
| 7,394,992 B2* | 7/2008 | Kimmitt et al. | ............... | 398/185 |
| 2003/0184838 A1 | 10/2003 | Akiyama et al. | | |
| 2004/0081470 A1 | 4/2004 | Griffin | | |
| 2004/0190910 A1* | 9/2004 | Akiyama et al. | ............... | 398/186 |
| 2005/0002675 A1* | 1/2005 | Sardesai et al. | ............... | 398/183 |
| 2006/0263098 A1* | 11/2006 | Akiyama et al. | ............... | 398/188 |
| 2009/0034988 A1 | 2/2009 | Akiyama et al. | | |

FOREIGN PATENT DOCUMENTS

| | | |
|---|---|---|
| JP | 2003-279912 | 10/2003 |
| JP | 2004-516743 | 6/2004 |
| JP | 2004-294883 | 10/2004 |

OTHER PUBLICATIONS

Takeshi Hoshida, et al., "Optimal 40 Gb/s Modulation Formats for Spectrally Efficient Long-Haul DWDM Systems", Journal of Lightwave Technology, vol. 20, No. 12, Dec. 2002, pp. 1989-1996.
O. Vassilieva, et al., "Non-Linear Tolerant and Spectrally Efficient 86Gbit/s RZ-DQPSK Format for a System Upgrade", OFC 2003, vol. 2, pp. 458-460, 2003.
Japanese Office Action dated Apr. 21, 2009 for corresponding Japanese Patent Application No. 2007-006125.

* cited by examiner

*Primary Examiner* — M. R. Sedighian
(74) *Attorney, Agent, or Firm* — Staas & Halsey LLP

(57) ABSTRACT

The disclosed device and method include varying phases of two data signals at a first predetermined frequency, performing multi-level phase modulation of a light based on the two data signals whose phases are varied at the first predetermined frequency, extracting a component having the first predetermined frequency from an optical signal subjected to the phase modulation, and controlling the phases of the two data signals based on the component extracted from the optical signal.

20 Claims, 32 Drawing Sheets

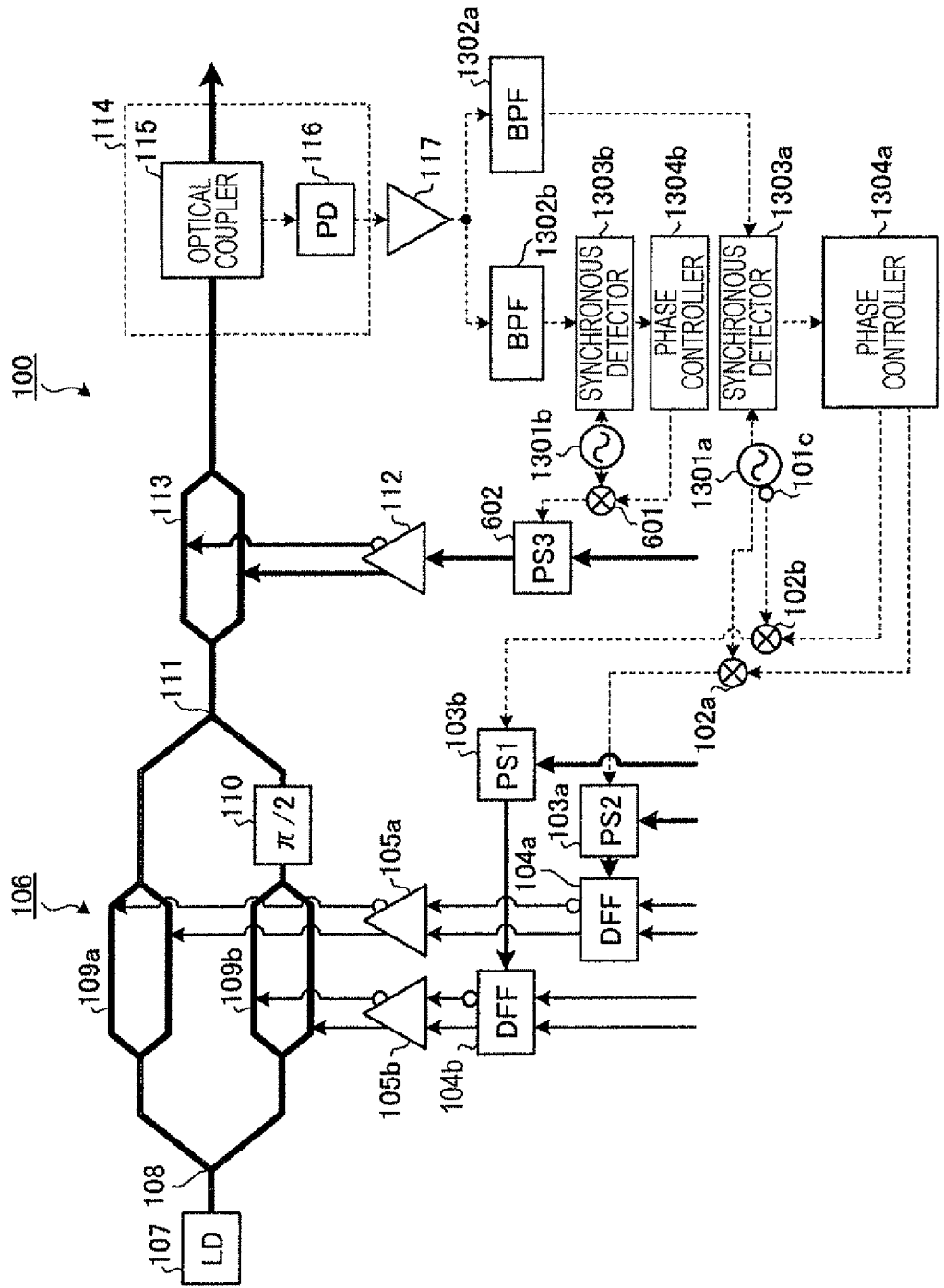

ical transmission systems is developing with the increasing amount of transmission traffic. It is necessary for the 40-Gbps optical transmission systems to realize transmission distances and spectral efficiencies equivalent to those of the 10-Gbps optical transmission systems in related art. In order to enable the realization, research and development of modulation methods having excellent Optical Signal-to-Noise Ratio (OSNR) performance and nonlinearity tolerance are promoted. Such modulation methods include Return-to-Zero Differential Phase Shift Keying (RZ-DPSK) and Carrier-Suppressed Return-to-Zero Differential Phase Shift Keying (CSRZ-DPSK).

OPTICAL DEVICE AND OPTICAL MODULATION METHOD

CROSS-REFERENCE TO RELATED APPLICATIONS

This application is related to and claims the benefit of priority from JP2007-006125, filed on Jan. 15, 2007, the entire contents of which are incorporated herein by reference.

BACKGROUND

1. Field

The present invention relates to an optical device performing phase modulation and to an optical modulation method.

2. Description of the Related Art

In recent years, demand for introduction of next-generation 40-Gbps optical transmission systems is developing with the increasing amount of transmission traffic. It is necessary for the 40-Gbps optical transmission systems to realize transmission distances and spectral efficiencies equivalent to those of the 10-Gbps optical transmission systems in related art. In order to enable the realization, research and development of modulation methods having excellent Optical Signal-to-Noise Ratio (OSNR) performance and nonlinearity tolerance are promoted. Such modulation methods include Return-to-Zero Differential Phase Shift Keying (RZ-DPSK) and Carrier-Suppressed Return-to-Zero Differential Phase Shift Keying (CSRZ-DPSK).

Return-to-Zero Differential Quadrature Phase Shift Keying (RZ-DQPSK) has a relatively narrower spectrum (higher-spectral efficiency), so the RZ-DQPSK is expected to be a major candidate for a modulation method for the next-generation optical transmission system.

In the RZ-DQPSK, a DQPSK phase modulator includes two Mach-Zehnder interferometers composing I and Q arms and performs quadrature phase modulation. The I and Q arms each perform binary phase modulation on the basis of a data signal input. The phase modulator multiplexes the data signals modulated by the I and Q arms and supplies the multiplexed signal to a RZ modulator as a DQPSK modulation signal.

The RZ modulator performs RZ modulation on the DQPSK modulation signal supplied from the phase modulator on the basis of a clock signal input. The RZ modulator externally outputs the signal that is subjected to the RZ modulation as a RZ-DQPSK signal.

SUMMARY

The disclosed apparatus (device) includes a first variation part varying phases of two data signals at a first predetermined frequency, a multi-level phase modulation part performing phase modulation of a light based on the two data signals whose phases are varied at the first predetermined frequency, a first extraction part extracting a component having the first predetermined frequency from an optical signal subjected to the phase modulation in the multi-level phase modulation part, and a first phase control part controlling the phases of the two data signals based on the component extracted from the optical signal in the first extraction part.

The disclosed optical modulation method includes varying phases of two data signals at a predetermined frequency, performing phase modulation of a light based on the two data signals whose phases are varied at the predetermined frequency, extracting a component having the predetermined frequency from a signal subjected to the phase modulation, and controlling the phases of the two data signals based on the component extracted from the signal.

Additional aspects and/or advantages will be set forth in part in the description which follows and, in part, will be apparent from the description, or may be learned by practice of the invention.

BRIEF DESCRIPTION OF THE DRAWINGS

These and/or other aspects and advantages will become apparent and more readily appreciated from the following description of the embodiments, taken in conjunction with the accompanying drawings of which:

FIG. 13 is a diagram illustrating an example of a configuration of an optical modulation apparatus;

DETAILED DESCRIPTION OF THE PREFERRED EMBODIMENTS

Figure 1:
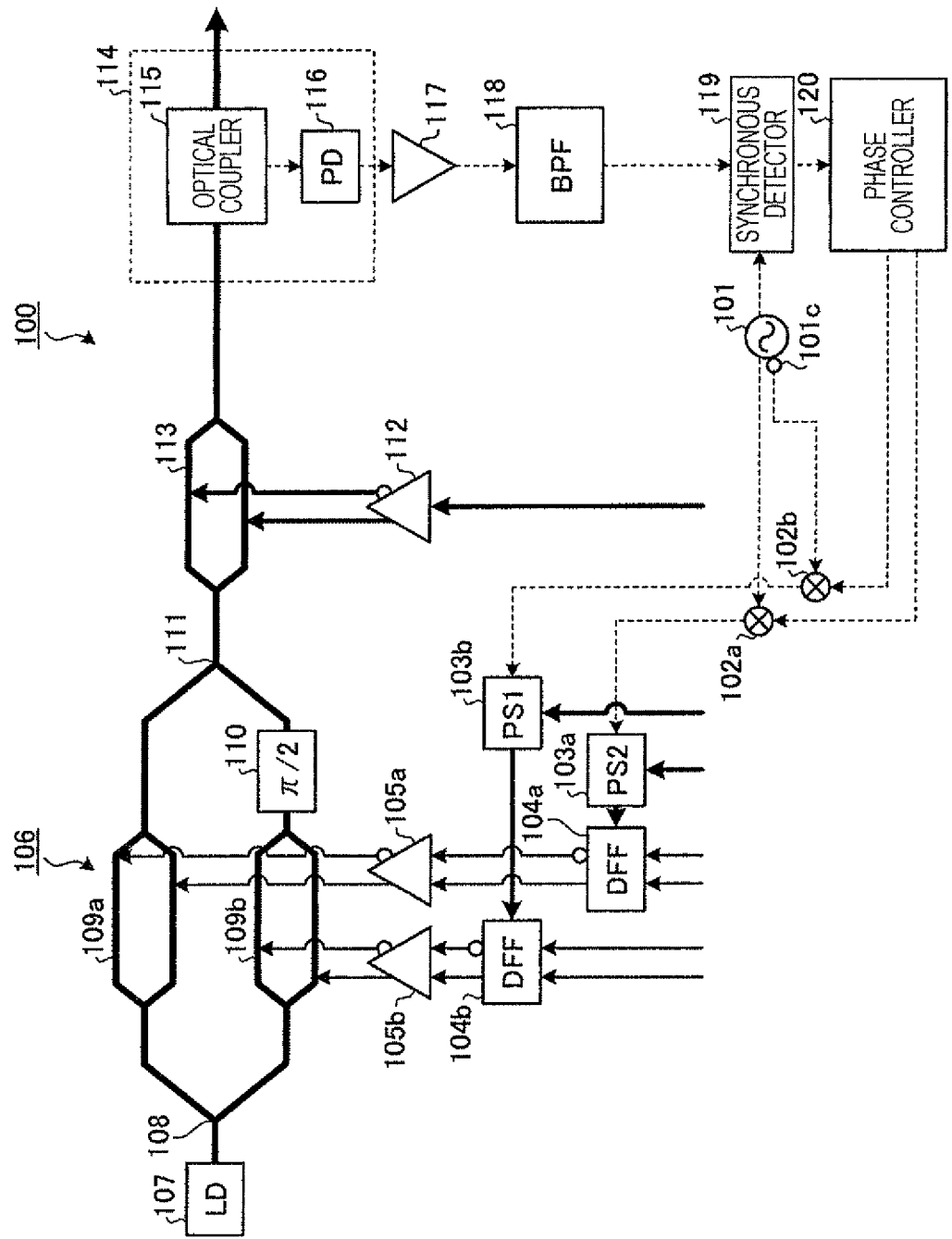
FIG. 1 is a diagram illustrating an example of a configuration of an optical modulation apparatus.

Reference will now be made in detail to the embodiments, examples of which are illustrated in the accompanying drawings, wherein like reference numerals refer to the like elements throughout. The embodiments are described below to explain the present invention by referring to the figures.

Exemplary embodiments of an optical device and an optical modulation method of the present invention will herein be described with reference to the attached drawings.

FIG. 1 is a diagram illustrating an example of a configuration of an optical modulation apparatus 100. The optical modulation apparatus 100 is a RZ-DQPSK modulation apparatus performing quadrature phase modulation and RZ modulation. The optical modulation apparatus 100 performs the modulation, for example, at a bit rate of 40 Gbps (at a baud rate of 20 GHz). Referring to FIG. 1 and the subject figures, solid lines represent data signals, bold lines represent clock signals, and dotted lines represent control signals.

Referring to FIG. 1, the optical modulation apparatus 100 may include an oscillator circuit 101, multiplier circuits 102a and 102b (hereinafter collectively referred to as a multiplier circuit 102), phase shifters 103a and 103b (hereinafter collectively referred to as a phase shifter 103) delay flip-flops (DFFs) 104a and 104b (hereinafter collectively referred to as a DFF 104), driver amplifiers 105a and 105b (hereinafter collectively referred to as a driver amplifier 105), a light source (LD) 107, a phase modulation unit 106, a driver amplifier 112, a RZ modulator 113, a monitoring unit 114, a transimpedance amplifier (TIA) 117, a bandpass filter (BPF) 118, a synchronous detector 119, and a phase controller 120.

Although specific examples of components of the optical modulation apparatus 100 are discusses with respect to FIG. 1, the disclosed optical modulation apparatus is not limited to any particular type of component(s).

The oscillator circuit 101 generates signals with a predetermined frequency. The signals with a predetermined frequency are low-frequency signals having, for example, a frequency f0 (for example, 1 kHz) sufficiently lower than frequencies of clock signals in the optical modulation apparatus 100. The oscillator circuit 101 supplies the generated low-frequency signals to the phase shifters 103a and 103b through the multiplier circuits 102a and 102b, respectively. The oscillator circuit 101 supplies the low-frequency signals having the same amplitude to the multiplier circuits 102a and 102b.

The oscillator circuit 101 includes an inverter 101c. The inverter 101c inverts the low-frequency signal to be supplied from the oscillator circuit 101 to the multiplier circuit 102b. In other words, the oscillator circuit 101 shifts the phase of the low-frequency signal to be supplied to the multiplier circuit 102b from that of the low-frequency signal to be supplied to the multiplier circuit 102a by 180°. Also in this case, the oscillator circuit 101 supplies the low-frequency signals having the same amplitude to the multiplier circuits 102a and 102b. The oscillator circuit 101 also supplies the generated low-frequency signal to the synchronous detector 119.

The multiplier circuit 102a multiplies the low-frequency signal supplied from the oscillator circuit 101 by a control signal supplied from the phase controller 120. The multiplier circuit 102a supplies the multiplied signal to the phase shifter 103a. The multiplier circuit 102b multiplies the low-frequency signal supplied from the oscillator circuit 101 by a control signal supplied from the phase controller 120. The multiplier circuit 102b supplies the multiplied signal to the phase shifter 103b.

The phase shifter 103a receives a clock signal (for example, 20 GHz) and supplies the received clock signal to the DFF 104a. The phase shifter 103a varies the phase of the clock signal to be supplied to the DFF 104a at the frequency f0 based on the signal supplied from the multiplier circuit 102a. The phase shifter 103a adjusts the phase of the clock signal to be supplied to the DFF 104a based on the control signal supplied from the phase controller 120 through the multiplier circuit 102a.

The phase shifter 103b receives a clock signal (for example, 20 GHz) and supplies the received clock signal to the DFF 104b. The phase shifter 103b varies the phase of the clock signal to be supplied to the DFF 104b at the frequency f0 based on the signal supplied from the multiplier circuit 102b. The phase shifter 103b adjusts the phase of the clock signal to be supplied to the DFF 104b based on the control signal supplied from the phase controller 120 through the multiplier circuit 102b.

The DFF 104a receives data signals (for example, 20 Gbps). The DFF 104a supplies the received data signals to the driver amplifier 105a by using the clock signal supplied from the phase shifter 103a as a drive signal. The DFF 104b receives data signals (for example, 20 Gbps). The DFF 104b supplies the received data signals to the driver amplifier 105b by using the clock signal supplied from the phase shifter 103b as a drive signal.

The driver amplifier 105a appropriately amplifies the data signals supplied from the DFF 104a and supplies the amplified data signals to the phase modulation unit 106. The driver amplifier 105b appropriately amplifies the data signals supplied from the DFF 104b and supplies the amplified data signals to the phase modulation unit 106. The light source 107 generates light and supplies the light to the phase modulation unit 106. As shown in FIG. 1, the light source 107 may be a laser diode (LD) in the optical modulation apparatus 100.

The phase modulation unit 106 may be a DQPSK modulation unit including two Mach-Zehnder interferometers composing I and Q arms. The phase modulation unit 106 includes a divider part 108, a phase modulator 109a, a phase modulator 109b, a phase shift part 110, and an optical multiplexer 111. The divider part 108 divides the lights (light portions) supplied from the light source 107. The divider part 108 supplies the divided lights to the phase modulator 109a and the phase modulator 109b.

The phase modulator 109a may be a Mach-Zehnder interferometer composing the I arm in the DQPSK modulating unit. The phase modulator 109a performs binary phase modulation to the lights supplied from the divider part 108 based the data signals supplied from the driver amplifier 105a. The phase modulator 109a supplies the optical signal subjected to the phase modulation to the optical multiplexer 111.

The phase modulator 109b is a Mach-Zehnder interferometer composing the Q arm in the DQPSK modulating unit. The phase modulator 109b performs the binary phase modulation to the lights supplied from the divider part 108 based on the data signals supplied from the driver amplifier 105b. The phase modulator 109b supplies the optical signal subjected to the phase modulation to the delay part 110.

The phase shift part 110 shifts a phase of the optical signal supplied from the phase modulator 109b by $\pi/2$ or substantially $\pi/2$. The phase shift part 110 supplies the delayed optical signal to the optical multiplexer 111. The optical multiplexer 111 multiplexes the optical signal supplied from the phase modulator 109a and the optical signal supplied from the phase shift part 110. The optical multiplexer 111 supplies the multiplexed optical signal to the RZ modulator 113.

The driver amplifier 112 receives a clock signal (for example, 20 GHz) and supplies the received clock signal to the RZ modulator 113. The RZ modulator 113 performs the RZ modulation to the optical signal supplied from the phase modulation unit 106 based on the clock signal supplied from the driver amplifier 112. The RZ modulator 113 supplies the optical signal subjected to the RZ modulation to the monitoring unit 114.

The monitoring unit 114 monitors the optical signal supplied from the RZ modulator 113. The monitoring unit 114 includes an optical coupler 115 and an optical receiver (PD) 116. The optical coupler 115 divides the optical signal supplied from the RZ modulator 113. The optical coupler 115 externally outputs one component (portion) of the divided optical signal and supplies the other component thereof to the optical receiver 116.

The optical receiver 116 receives the optical signal from the optical coupler 115 and converts the received optical signal into an electrical signal. The optical receiver 116 supplies the electrical signal resulting from the conversion to the TIA 117 as a monitor signal. The optical receiver 116 may be a photodetector (PD) in the optical modulation apparatus 100 illustrated in FIG. 1. The TIA 117 appropriately amplifies the monitor signal supplied from the monitoring unit 114 and supplies the amplified signal to the BPF 118. Although the optical receiver in FIG. 1 is described as being a photodetector (PD), the invention is not limited to any particular receiver or sensor.

The BPF 118 extracts a component (portion) having a frequency around (substantially equal to or within a predetermined range) the frequency f0 from the monitor signal supplied from the TIA 117. This extraction enables reduction of noise in the monitor signal supplied from the TIA 117. The BPF 118 supplies the extracted component to the synchronous detector 119. It is possible to omit the BPF 118 from the optical modulation apparatus 100 illustrated in FIG. 1.

The synchronous detector 119 performs synchronous detection based on the low-frequency signal supplied from the oscillator circuit 101 and the monitor signal supplied from the BPF 118 to extract a component having the frequency f0, which is the frequency of the low-frequency signal, from the monitor signal supplied from the BPF 118. The synchronous detector 119 supplies the extracted component having the frequency to in the monitor signal to the phase controller 120.

The phase controller 120 controls adjustment of a difference in phase caused by the phase shifter 103a and the phase shifter 103b based on the component having the frequency f0 in the monitor signal, supplied from the synchronous detector 119. Specifically, the phase controller 120 controls at least one of the phase shifters 103a and 103b so as to minimize an intensity of the component having the frequency f0 in the monitor signal supplied from the BPF 118 or so as to yield a value near zero in the synchronous detection in the synchronous detector 119. The phase controller 120 supplies control signals used for controlling the phase shifters 103a and 103b to the phase shifters 103a and 103b through the multiplier circuits 102a and 102b, respectively.

The monitoring unit 114 is provided in the optical modulation apparatus 100 illustrated in FIG. 1, in addition to the phase modulation unit 106 and the RZ modulator 113, to monitor the optical signal. However, if a Mach-Zehnder interferometer having a multimode interference (MMI) coupler at the output portion is used as an example of the RZ modulator 113, one end of the MMI coupler may be connected with the PD (an optical receiver) and a positive-phase or negative-phase signal detected by the PD may be supplied to the TIA 117 as the monitor signal.

Although the phase shifter 103 is used to control the phase of the clock signal used for driving the DFF 104 in the optical modulation apparatus 100 illustrated in FIG. 1, the phase shifter 103 may be provided between the DFF 104 and the driver amplifier 105 or between the driver amplifier 105 and the phase modulation unit 106 to control the phase of the data signal.

Figure 2:
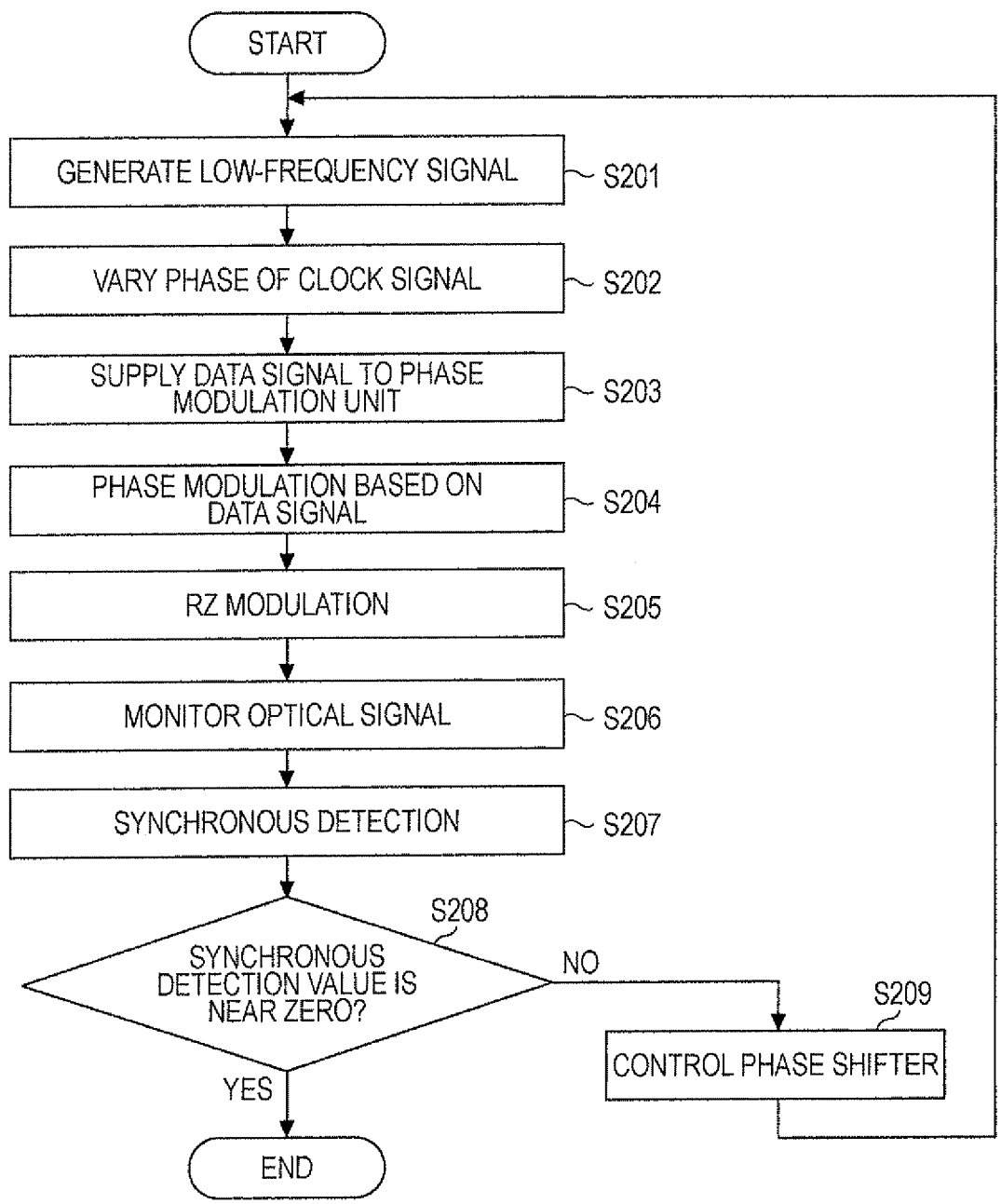
FIG. 2 is a flowchart illustrating an example of a phase difference compensation process of an optical modulation apparatus.

FIG. 2 is a flowchart illustrating an example of a phase difference compensation process in the optical modulation apparatus 100. Referring to FIG. 2, in operation S201, the oscillator circuit 101 generates low-frequency signals having the frequency f0 and supplies the generated low-frequency signals to the phase shifter 103. Specifically, the oscillator circuit 101 supplies the low-frequency signal to the phase shifter 103a through the multiplier circuit 102a. The oscillator circuit 101 also supplies the low-frequency signal inverted relative to the signal supplied to the phase shifter 103a to the phase shifter 103b through the multiplier circuit 102b.

In operation S202, the phase shifter 103 varies the phase of a clock signal at the frequency f0. Specifically, the phase shifter 103a varies the phase of a clock signal to be supplied to the DFF 104a at the frequency f0 based on the low-frequency signal supplied from the oscillator circuit 101 through the multiplier circuit 102a, and the phase shifter 103b varies the phase of a clock signal to be supplied to the DFF 104b at the frequency f0 based on the low-frequency signal supplied from the oscillator circuit 101 through the multiplier circuit 102b.

In operation S203, the DFF 104 supplies the data signal to the phase modulation unit 106. Specifically, the DFF 104a supplies the data signal to the phase modulator 109a through the driver amplifier 105a by using the clock signal supplied from the phase shifter 103a as a drive signal, and the DFF 104b supplies the data signal to the phase modulator 109b through the driver amplifier 105b by using the clock signal supplied from the phase shifter 103b as a drive signal.

Since the phases of the clock signals driving the DFFs 104a and 104b are varied at the frequency f0, the phases of the data signals output from the DFFs 104a and 104b are also varied at the frequency f0. The variation of the phase of the data signal output from the DFF 104b is shifted from the variation of the phase of the data signal output from the DFF 104a by 180°.

In operation S204, the phase modulation unit 106 performs the phase modulation based on the data signal supplied from the driver amplifier 105. Since the phase of the data signal supplied from the driver amplifier 105a is varied at the frequency f0, the phase resulting from the modulation in the phase modulator 109a is also varied at the frequency f0. Since the phase of the data signal supplied from the driver amplifier 105b is varied at the frequency f0, the phase resulting from the modulation in the phase modulator 109b is also varied at the frequency f0.

In addition, since the variation of the phase of the data signal output from the DFF 104b is shifted from the variation of the phase of the data signal output from the DFF 104a by 180°, the phase resulting from the modulation in the phase modulator 109b is also shifted from the phase resulting from the modulation in the phase modulator 109a by 180°. Accordingly, the difference in phase between the phase modulators 109a and 109b is varied at the frequency f0.

In operation S205, the RZ modulator 113 performs the RZ modulation to the optical signal subjected to the phase modulation in the phase modulation unit 106. In operation S206, the monitoring unit 114 monitors the optical signal subjected to the RZ modulation in the RZ modulator 113 and outputs a monitor signal. In operation S207, the synchronous detector 119 performs the synchronous detection to the monitor signal supplied from the monitoring unit 114. Specifically, the synchronous detector 119 extracts a component having the frequency f0 from the monitor signal supplied from the monitoring unit 114.

As described above, the difference in phase between the phase modulators 109a and 109b in the phase modulation unit 106 is varied at the frequency f0. Accordingly, an intensity of the component having the frequency f0 in the monitor signal, extracted by the synchronous detector 119, indicates information about the difference in phase between the phase modulators 109a and 109b.

In operation S208, the phase controller 120 determines whether the component having the frequency f0 in the monitor signal supplied from the BPF 118, extracted in operation S207, has a minimum intensity or whether the synchronous detection in the synchronous detector 119 results in a value near zero.

If the phase controller 120 determines that the component having the frequency f0 in the monitor signal extracted in operation S207 does not have the minimum intensity or that the synchronous detection in the synchronous detector 119 does not result in a value near zero (the determination in operation S208 is negative), then in operation S209, the phase controller 120 controls the phase shifter 103 so as to adjust the amount of phase in the phase shifter 103. Then, the process goes back to operation S201 to repeat the above operations.

If the phase controller 120 determines that the component having the frequency f0 in the monitor signal extracted in operation S207 has the minimum intensity or that the synchronous detection in the synchronous detector 119 results in a value near zero (the determination in operation S208 is affirmative), the phase difference compensation process terminates. The process illustrated in FIG. 2 is an exemplary algorithm and another algorithm may be applied to the process illustrated in FIG. 2. Although specific components of FIG. 1 are used to illustrate operations of FIG. 2, the disclosed operations are not limited to being performed by component(s) shown in FIG. 1.

Figure 3A:
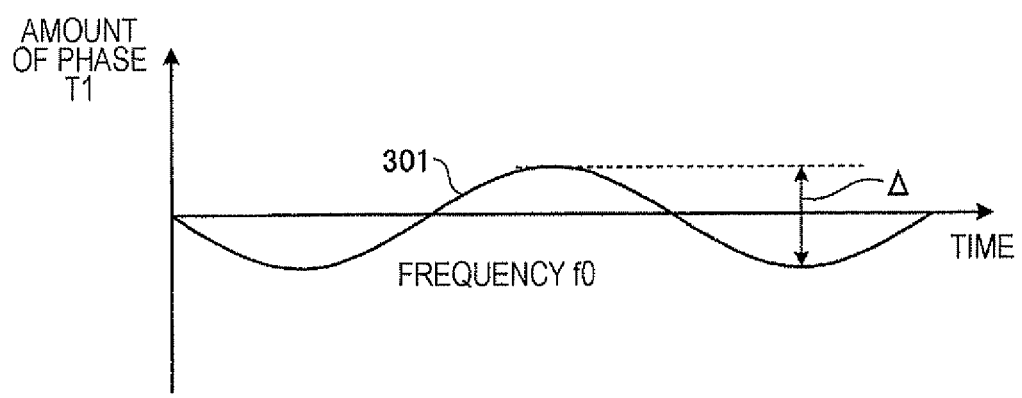
FIG. 3A is a graph illustrating an exemplary variation of an amount of phase of a clock signal output from a phase shifter.
Figure 3B:
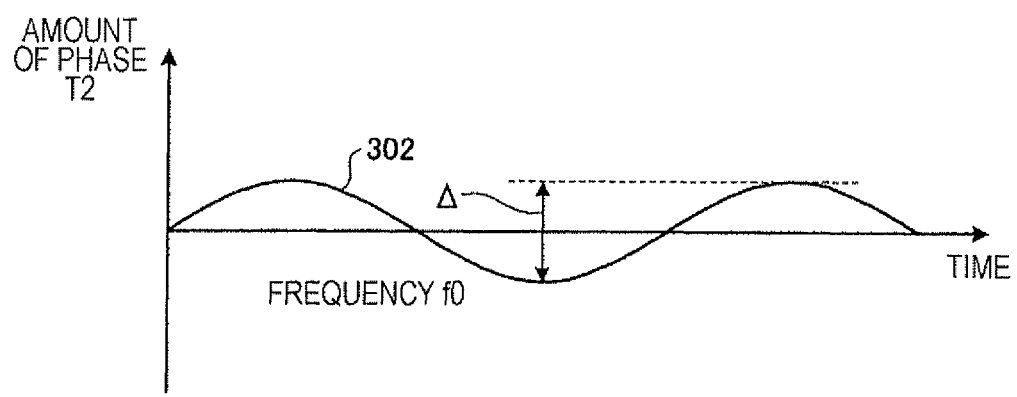
FIG. 3B is a graph illustrating an exemplary variation of an amount of phase of a clock signal output from another phase shifter.

FIG. 3A is a graph illustrating an exemplary variation of an amount of phase of a clock signal output from a phase shifter such as the phase shifter 103a shown in FIG. 1. FIG. 3B is a graph illustrating an exemplary variation of an amount of phase of a clock signal output from a phase shifter such as the phase shifter 103b shown in FIG. 1. The horizontal axes in FIGS. 3A and 3B represent time. The vertical axis in FIG. 3A represents an amount of phase of the clock signal caused by the phase shifter 103a. The vertical axis in FIG. 3B represents an amount of phase of the clock signal caused by the phase shifter 103b.

As described above, the oscillator circuit 101 generates the low-frequency signal(s) and the phase shifter 103 varies the amounts of phase of the clock signals based on the low-frequency signals. Accordingly, as illustrated in FIGS. 3A and 3B, the amount of phase of a clock signal 301 output from the phase shifter 103a and the amount of phase of a clock signal 302 output from the phase shifter 103b are varied at the frequency f0.

Since one of the low-frequency signals output from the oscillator circuit 101 is inverted relative to the other thereof, the amount of phase of the clock signal 301 is shifted from the amount of phase of the clock signal 302 by 180°. The amount of phase of the clock signal 301 is denoted by "T1" and the amount of phase of the clock signal 302 is denoted by "T2". The amplitudes of the variations of the amounts of phase of the clock signals 301 and 302 are denoted by "Δ".

Figure 4A:
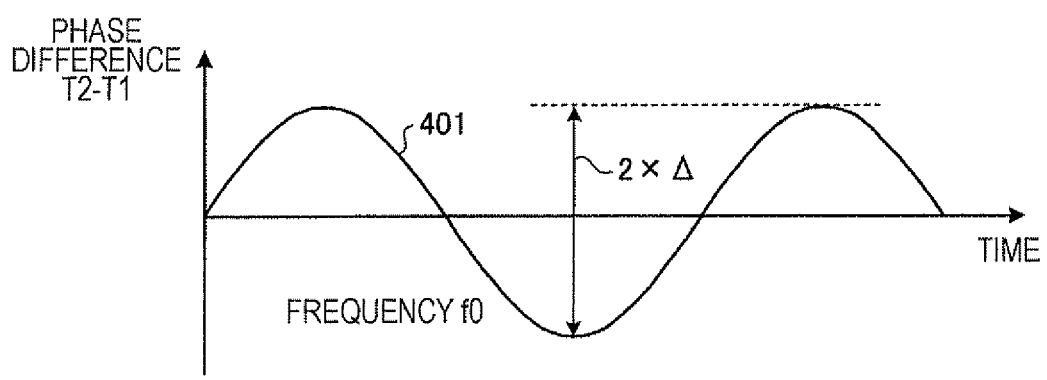
FIG. 4A is a graph illustrating an exemplary variation of a difference in phase between I and Q arms.

FIG. 4A is a graph illustrating an exemplary variation of a difference in phase between the I and Q arms according to an embodiment of the present invention. Referring to FIG. 4A, the horizontal axis represents time and the vertical axis represents the difference in phase between the I and Q arms. A difference 401 in phase between the I and Q arms corresponds to a difference "T2−T1" in the amount of phase between the clock signals 301 and 302 (FIGS. 3A and 3B). As illustrated in FIGS. 3A and 3B, the amount of phase of the clock signal 301 is shifted from the amount of phase of the clock signal 302 by 180°. Accordingly, as illustrated in FIG. 4A, the difference 401 in phase between the I and Q arms is varied at the frequency f0 and have an amplitude "2×Δ".

Figure 4B:
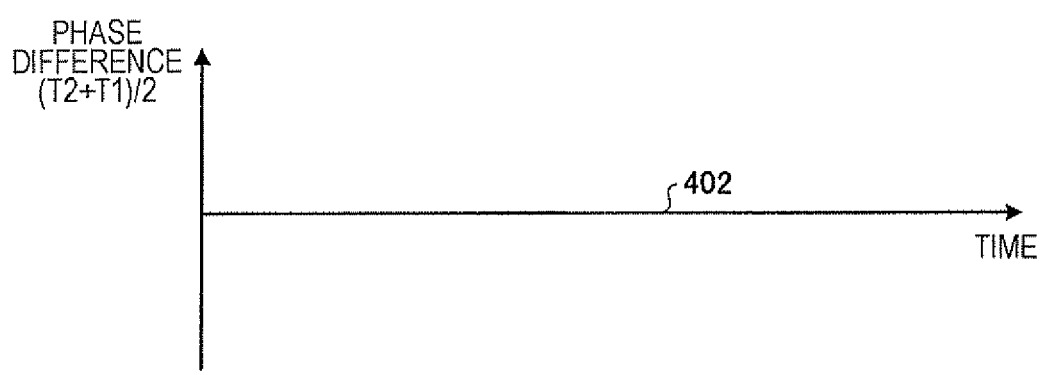
FIG. 4B is a graph illustrating an exemplary variation of a difference in phase between data and clock signals.

FIG. 4B is a graph illustrating an exemplary variation of a difference in phase between data and clock signals according to an embodiment of the present invention. Referring to FIG. 4B, the horizontal axis represents time and the vertical axis represents the difference in phase between the data and clock signals. A difference 402 in phase between the data and clock signals corresponds to the difference between the average of the amounts of phase of the clock signals 301 and 302 and the amount of phase of the clock signal in the RZ modulator 113. Since the amount of phase of the clock signal in the RZ modulator 113 is not varied, the difference 402 in phase between the data and clock signals is calculated by "(T2+T1)/2".

As illustrated in FIGS. 3A and 3B, since the amount of phase of the clock signal 301 is shifted from the amount of phase of the clock signal 302 by 180°, the amount of phase of the clock signal 301 is offset by the amount of phase of the clock signal 302. Consequently, as illustrated in FIG. 4B, the difference 402 in phase between the data and clock signals is constantly equal to zero.

As illustrated in FIGS. 4A and 4B, the amplitude of the low-frequency signal supplied from the oscillator circuit 101 to the phase shifter 103a is made to be identical to the amplitude of the low-frequency signal supplied from the oscillator circuit 101 to the phase shifter 103b, and the phase of the low-frequency signal supplied from the oscillator circuit 101 to the phase shifter 103a is inverted relative to the phase of the low-frequency signal supplied from the oscillator circuit 101 to the phase shifter 103b. Accordingly, the difference 401 in phase between the I and Q arms can be varied at the frequency f0 without having to vary the difference 402 in phase between the data and clock signals. In addition, the amplitude of the variation of the difference in phase between the I and Q arms can be double of the amplitude of the low-frequency signal, that is, can be made equal to "2×Δ". Consequently, it is easy for the synchronous detector 119 to detect the difference 401 in phase between the I and Q arms.

Figure 5:
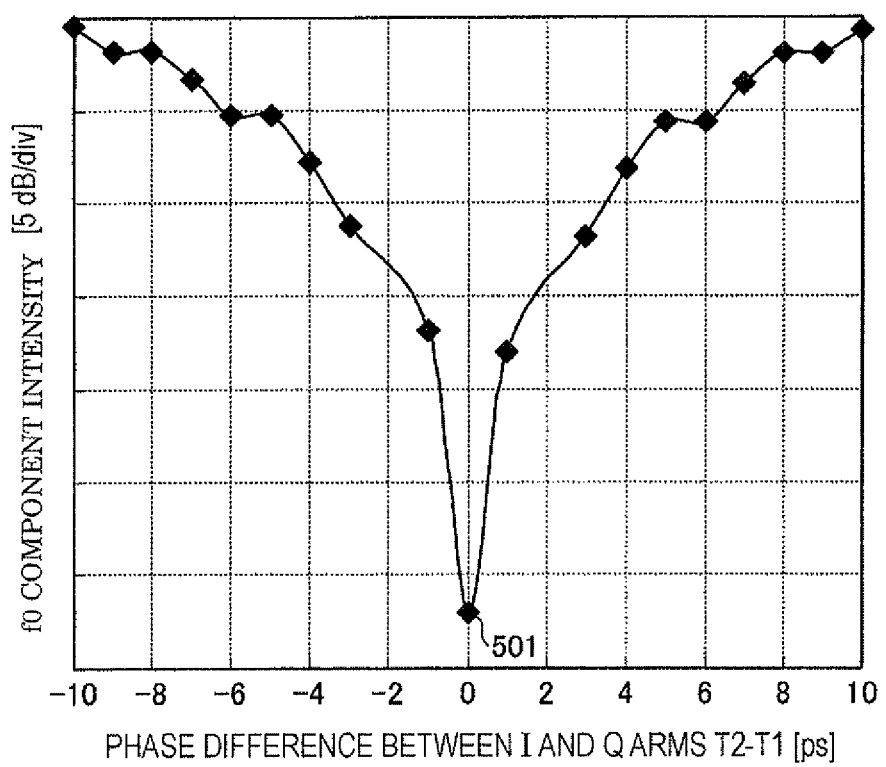
FIG. 5 is a graph illustrating a relationship between a difference in phase between the I and Q arms and an intensity of a component having a frequency f0 in a monitor signal.

FIG. 5 is a graph illustrating a relationship between a difference in phase between the I and Q arms and an intensity of a component having the frequency f0 in a monitor signal. Referring to FIG. 5, the horizontal axis represents the difference in phase between the I and Q arms and the vertical axis represents the intensity [5 dB/div] of the component having the frequency f0 in the monitor signal output from the BPF 118.

As illustrated in FIG. 5, the difference in phase between the I and Q arms becomes zero at a point 501 where the component having the frequency f0 in the monitor signal has the minimum intensity. Accordingly, the phase controller 120 controls at least one of the phase shifters 103a and 103b so as to minimize the intensity of the component having the frequency f0 in the monitor signal, thereby optimizing the difference in phase between the I and Q arms.

As described above, the optical modulation apparatus 100 according to an embodiment of the present invention can vary phases of the two data signals at the frequency f0 with the phase shifter 103 to perform feedback-control of the phases of the two data signals. Consequently, with the optical modulation apparatus 100 according to an embodiment of the present invention, it is possible to precisely compensate for a difference in phase between the I and Q arms and improve a transmission performance of the optical transmission system.

Figure 6:
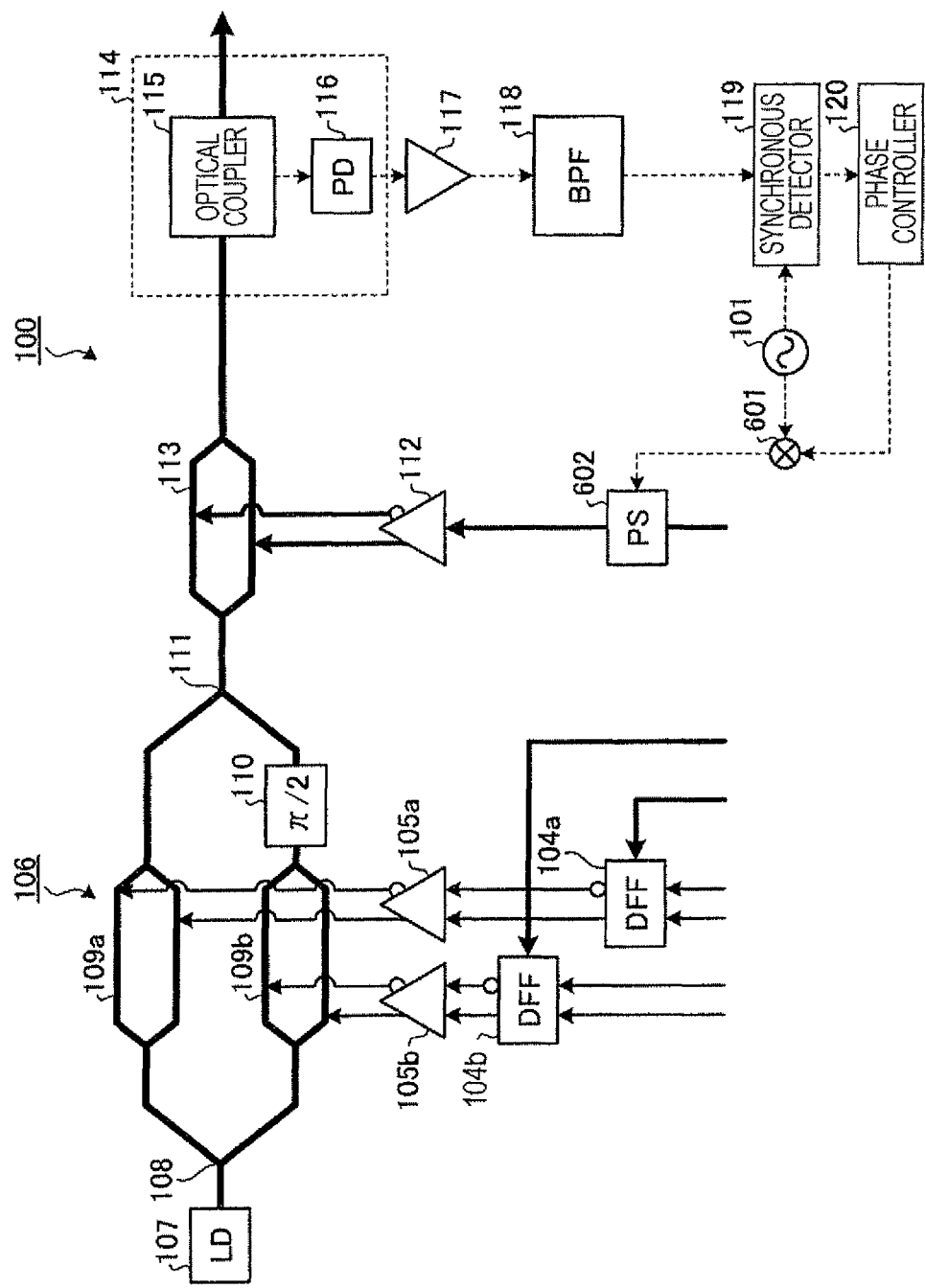
FIG. 6 is a diagram illustrating an example of a configuration of an optical modulation apparatus.

FIG. 6 is a diagram illustrating an example of a configuration of the optical modulation apparatus 100. The same reference numerals are used in FIG. 6 to identify the same components illustrated in FIG. 1. A description of such components is omitted herein. The optical modulation apparatus 100 according to an embodiment of the present invention does not vary the phase of the clock signal to be supplied to the DFF 104 but varies the phase of the clock signal to be supplied to the RZ modulator 113. Accordingly, the multiplier circuits 102a and 102b and the phase shifters 103a and 103b according to an embodiment of the present invention may not be provided in the optical modulation apparatus 100 according to an embodiment of the present invention. As in the embodiment described above, the BPF 118 may not be provided in the optical modulation apparatus 100 illustrated in FIG. 6.

The optical modulation apparatus 100 according to an embodiment of the present invention includes a multiplier circuit 601 and a phase shifter (PS) 602, in addition to the components in the optical modulation apparatus 100 according to an embodiment of the present invention. The oscillator circuit 101 supplies a low-frequency signal having the frequency f0 to the phase shifter 602 through the multiplier circuit 601. The multiplier circuit 601 multiplies the low-frequency signal supplied from the oscillator circuit 101 by a control signal supplied from the phase controller 120. The multiplier circuit 601 supplies the signal resulting from the multiplication to the phase shifter 602.

The phase shifter 602 receives a clock signal and supplies the received clock signal to the driver amplifier 112. The phase shifter 602 varies the phase of the clock signal to be supplied to the driver amplifier 112 at the frequency f0 based on the signal supplied from the multiplier circuit 601. The driver amplifier 112 supplies the clock signal supplied from the phase shifter 602 to the RZ modulator 113. The phase shifter 602 adjusts the phase of the clock signal to be supplied to the driver amplifier 112 based on the control signal supplied from the phase controller 120 through the multiplier circuit 601.

The phase controller 120 controls adjustment of a difference in phase caused by the phase shifter 602 based on the component having the frequency f0 in the monitor signal, supplied from the synchronous detector 119. Specifically, the phase controller 120 controls the phase shifter 602 so as to minimize an intensity of a component having the frequency f0 in the monitor signal supplied from the BPF 118 or so as to yield a value near zero in the synchronous detection in the synchronous detector 119. The phase controller 120 supplies the control signal used for controlling the phase shifter 602 to the phase shifter 602 through the multiplier circuit 601.

As described above, the optical modulation apparatus 100 according to an embodiment of the present invention can vary the phase of the clock signal at the frequency f0 with the phase shifter 602 to perform the feedback-control of the phase of the clock signal. Consequently, with the optical modulation apparatus 100 according to an embodiment of the present invention, it is possible to precisely compensate for the difference in phase between the data and clock signals to improve the transmission performance of the optical transmission system.

Figure 7:
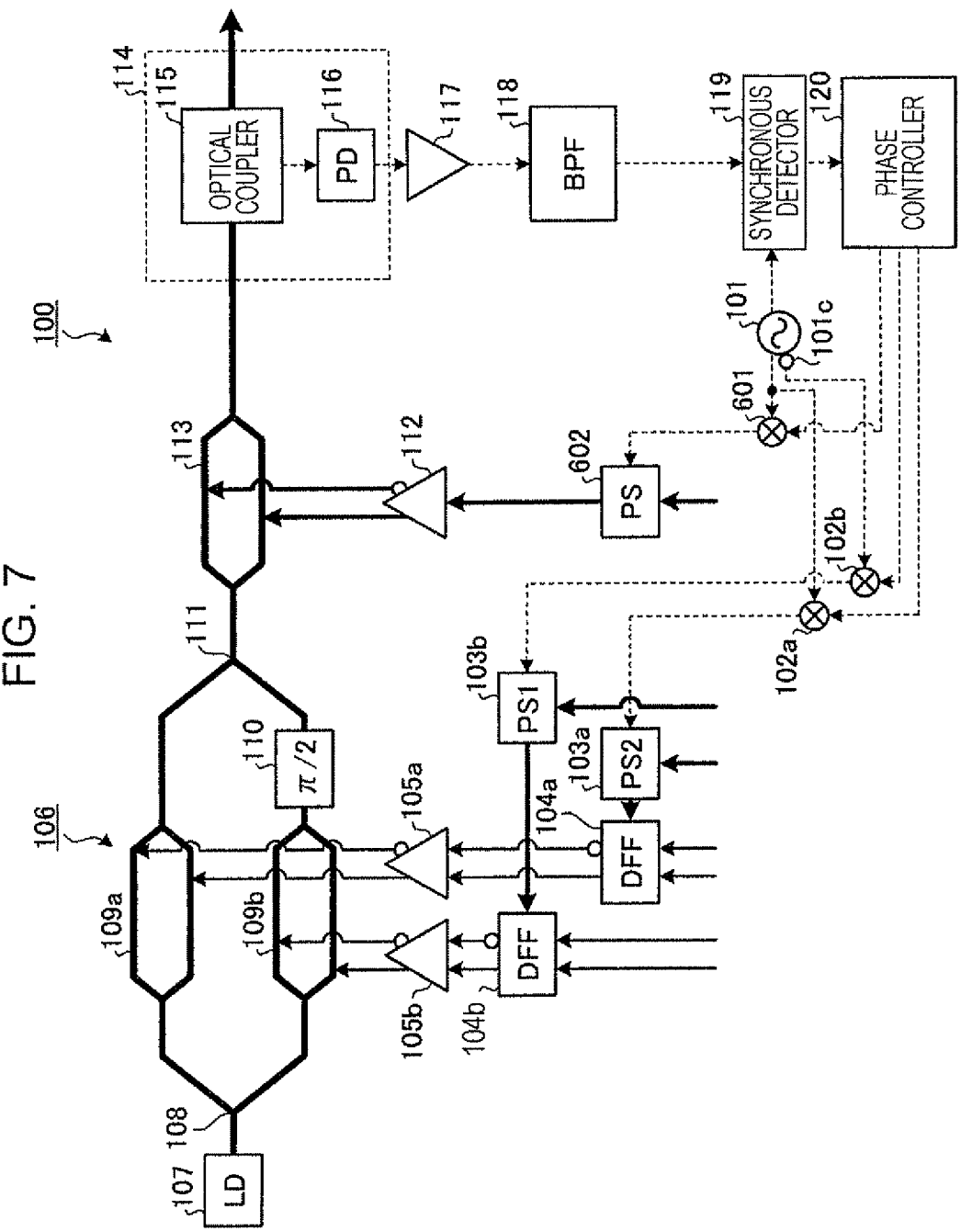
FIG. 7 is a diagram illustrating an example of a configuration of an optical modulation apparatus.

FIG. 7 is a diagram illustrating an example of an configuration of the optical modulation apparatus 100. The same reference numerals are used in FIG. 7 to identify the same components illustrated in FIG. 1 or FIG. 6. A description of such components is omitted herein. The optical modulation apparatus 100 according to an embodiment of the present invention includes the multiplier circuit 601 and the phase shifter 602 described above in the embodiment of the present invention described above with respect to FIG. 6, in addition to the components of the optical modulation apparatus 100 according to the embodiment of the present invention. As in the embodiment described above, the BPF 118 may not be provided in the optical modulation apparatus 100 illustrated in FIG. 7.

The optical modulation apparatus 100 according to an embodiment of the present invention adjusts a difference in phase between the I and Q arms and a difference in phase between the data and clock signals in a time division manner. For example, the phase controller 120 compensates for a difference in phase between data and clock signals by controlling the phase shifter 602 so as to minimize the intensity of the component having the frequency f0 in the monitor signal supplied from the BPF 118. In this case, the phase controller 120 controls the phase shifters 103a and 103b so as not to vary the difference in phase between the I and Q arms.

Next, the phase controller 120 controls at least one of the phase shifters 103a and 103b so as to minimize the intensity of the component having the frequency f0 in the monitor signal supplied from the BPF 118 to compensate for the difference in phase between the I and Q arms. In this case, the phase controller 120 controls the phase shifter 602 so as not to adjust the phase of the clock signal. Although the compensation is described as being first performed to the difference in phase between the data and clock signals and, then, to the difference in phase between the I and Q arms, the compensation may be first performed to the difference in phase between the I and Q arms and, then, to the difference in phase between the data and clock signals.

Figure 8A:
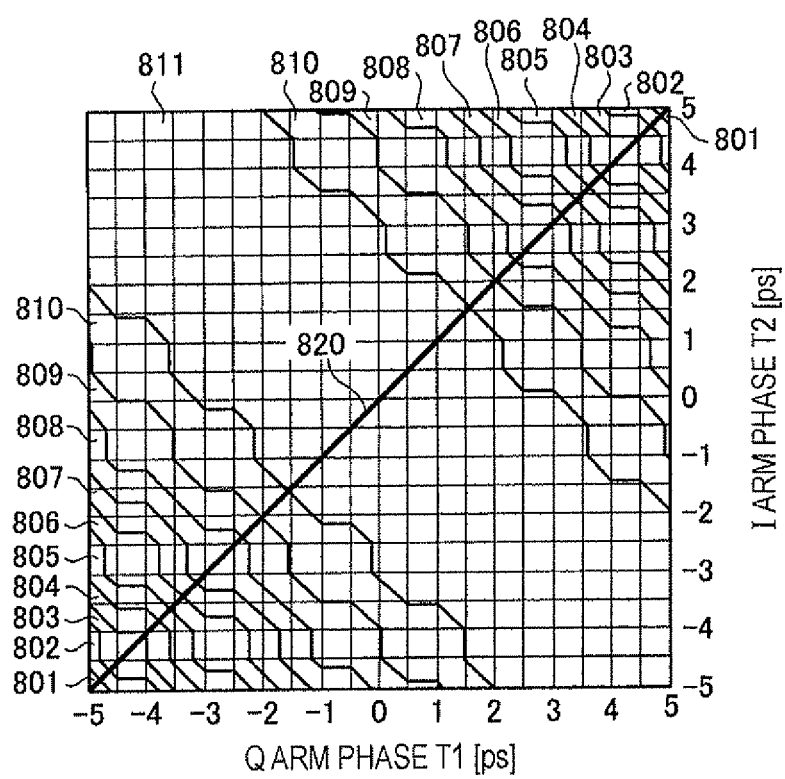
FIG. 8A is a graph illustrating an example of an intensity of a component having a frequency f0 in a monitor signal supplied from a BPF, in compensation of a difference in phase between data and clock signals.

FIG. 8A is a graph illustrating an example of an intensity of a component having the frequency f0 in the monitor signal supplied from the BPF 118, in compensation of a difference in phase between the data and clock signals according to an embodiment of the present invention. FIG. 8A shows an intensity of a component having the frequency f0 in the monitor signal when the phase controller 120 sets an amount of phase in the phase shifter 602 to zero and varies the amounts of phase in the phase shifters 103a and 103b. Referring to FIG. 8A, the horizontal axis represents the phase T1 of the Q arm, that is, the amount of phase in the phase shifter 103a under the control of the phase controller 120. The vertical axis represents the phase T2 of the I arm, that is, the amount of phase in the phase shifter 103b under the control of the phase controller 120 (the same applies to FIG. 9A).

Referring to FIG. 8A, the component having the frequency f0 in the monitor signal has an intensity of 1E-11-1.1E-11 a.u. in an area 801, the component having the frequency f0 in the monitor signal has an intensity of 9E-12-1E-11 a.u. in an area 802, the component having the frequency f0 in the monitor signal has an intensity of 8E-12-9E-12 a.u. in an area 803, the component having the frequency f0 in the monitor signal has an intensity of 7E-12-8E-12 a.u. in an area 804, the component having the frequency f0 in the monitor signal has an intensity of 6E-12-7E-12 a.u. in an area 805, the component having the frequency f0 in the monitor signal has an intensity of 5E-12-6E-12 a.u. in an area 806, the component having the frequency f0 in the monitor signal has an intensity of 4E-12-5E-12 a.u. in an area 807, the component having the frequency f0 in the monitor signal has an intensity of 3E-12-4E-12 a.u. in an area 808, the component having the frequency f0 in the monitor signal has an intensity of 2E-12-3E-12 a.u. in an area 809, the component having the frequency f0 in the monitor signal has an intensity of 1E-12-2E-12 a.u. in an area 810, and the component having the frequency f0 in the monitor signal has an intensity of 0-1E-12 a.u. in an area 811. A straight line 820 indicates a dependency on a difference in phase between data and clock signals when the difference T2−T1 in phase between I and Q arms is set to zero.

Figure 8B:
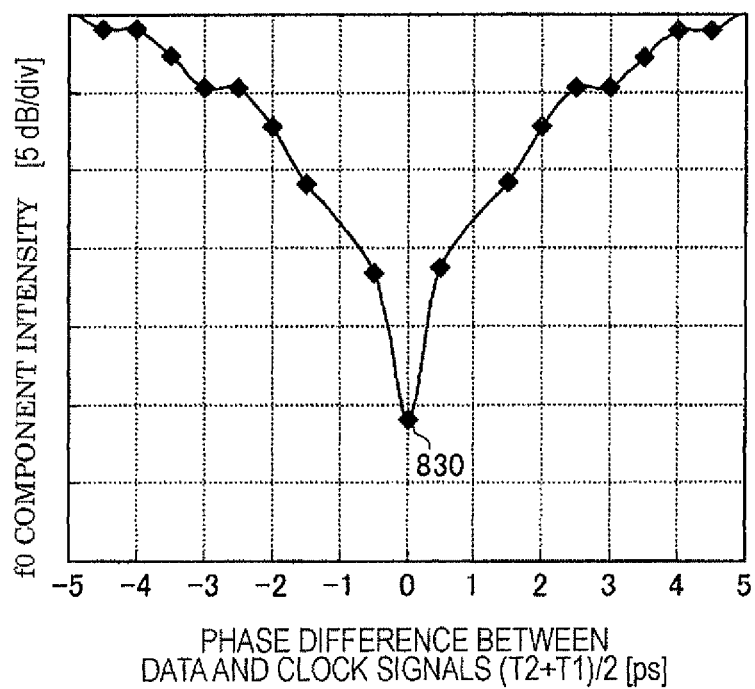
FIG. 8B is a graph illustrating the relationship between a difference in phase between data and clock signals and an intensity of a component having the frequency f0 in a monitor signal supplied from the BPF.

FIG. 8B is a graph illustrating a relationship between a difference in phase between data and clock signals and an intensity of a component having the frequency f0 in the monitor signal supplied from the BPF 118 according to an embodiment of the present invention. FIG. 5B shows the characteristics resulting from extraction of the straight line 820 in FIG. 8A. As illustrated in FIG. 8B, the difference in phase between the data and clock signals becomes zero at a point 830 where the component having the frequency f0 in the monitor signal has the minimum intensity. Accordingly, the phase controller 120 controls at least one of the phase shifters 103a, the phase shifter 103b, and the phase shifter 602 so as to minimize the intensity of the component having the frequency f0 in the monitor signal, thereby optimizing the difference in phase between the data and clock signals.

Figure 9A:
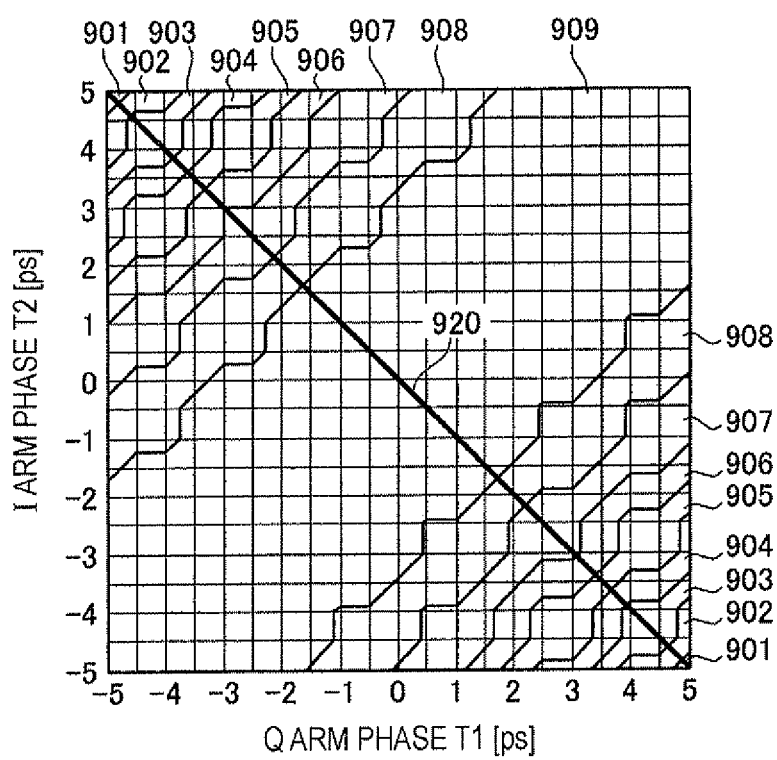
FIG. 9A is a graph illustrating an example of an intensity of a component having the frequency f0 in a monitor signal supplied from the BPF, in compensation of a difference in phase between I and Q arms.

FIG. 9A is a graph illustrating an example of an intensity of a component having the frequency f0 in the monitor signal supplied from the BPF 118, in compensation of a difference in phase between the I and Q arms according to an embodiment of the present invention. Referring to FIG. 9A, the component having the frequency f0 in the monitor signal has an intensity of 8E-11-9E-11 a.u. in an area 901, the component having the frequency f0 in the monitor signal has an intensity of 7E-11-8E-11 a.u. in an area 902, the component having the frequency f0 in the monitor signal has an intensity of 6E-11-7E-11 a.u. in an area 903, the component having the frequency f0 in the monitor signal has an intensity of 5E-11-6E-11 a.u. in an area 904, the component having the frequency f0 in the monitor signal has an intensity of 4E-11-5E-11 a.u. in an area 905, the component having the frequency f0 in the monitor signal has an intensity of 3E-11-4E-11 a.u. in an area 906, the component having the frequency f0 in the monitor signal has an intensity of 2E-11-3E-11 a.u. in an area 907, the component having the frequency f0 in the monitor signal has an intensity of 1E-11-2E-11 a.u. in an area 908, and the component having the frequency f0 in the monitor signal has an intensity of 0-1E-11 a.u. in an area 909. A straight line 920 indicates the dependency on the difference in phase between the I and Q arms when the difference in phase between the data and clock signals is set to zero.

Figure 9B:
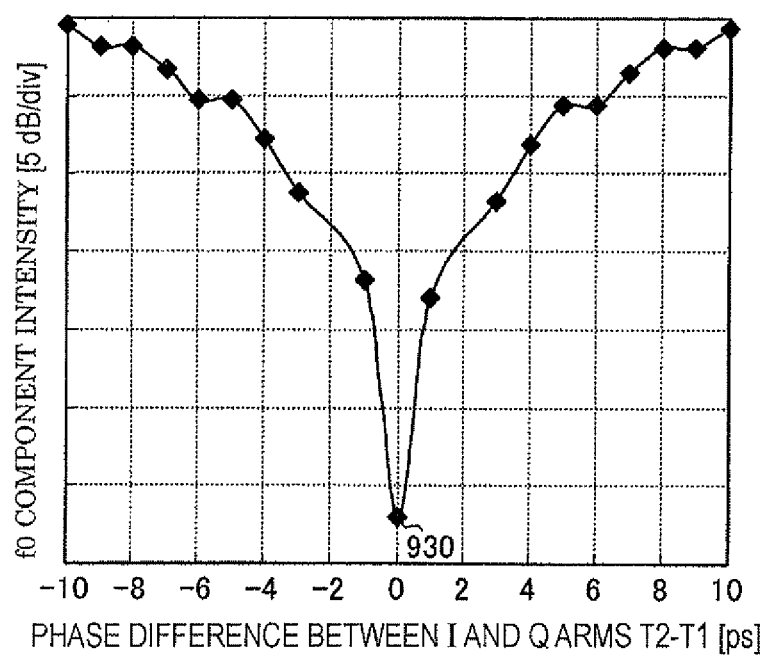
FIG. 9B is a graph illustrating a relationship between a difference in phase between the I and Q arms and an intensity of a component having the frequency f0 in a monitor signal supplied from the BPF.

FIG. 9B is a graph illustrating a relationship between a difference in phase between the I and Q arms and an intensity of a component having the frequency f0 in the monitor signal supplied from the BPF 118 according to an embodiment of the present invention. FIG. 9B shows the characteristics resulting from extraction of the straight line 920 in FIG. 9A. As illustrated in FIG. 9B, the difference in phase between the I and Q arms becomes zero at a point 930 where the component having the frequency f0 in the monitor signal has the minimum strength. Accordingly, the phase controller 120 controls at least one of the phase shifters 103a, the phase shifter 103b, and the phase shifter 602 so as to minimize the intensity of the component having the frequency f0 in the monitor signal, thereby optimizing the difference in phase between the I and Q arms.

As described above, the optical modulation apparatus 100 according to an embodiment of the present invention can vary the phases of the two data signals at the frequency f0 with the phase shifter 103 to perform the feedback-control of the phases of the two data signals. The optical modulation apparatus 100 can also vary the phase of the clock signal at the frequency f0 with the phase shifter 602 to perform the feedback-control of the phase of the clock signal. Consequently with the optical modulation apparatus 100 according to an embodiment of the present invention, it is possible to compensate for the difference in phase between the I and Q arms and the difference in phase between the data and clock signals in a time division manner to improve the transmission performance of the optical transmission system.

Figure 10:
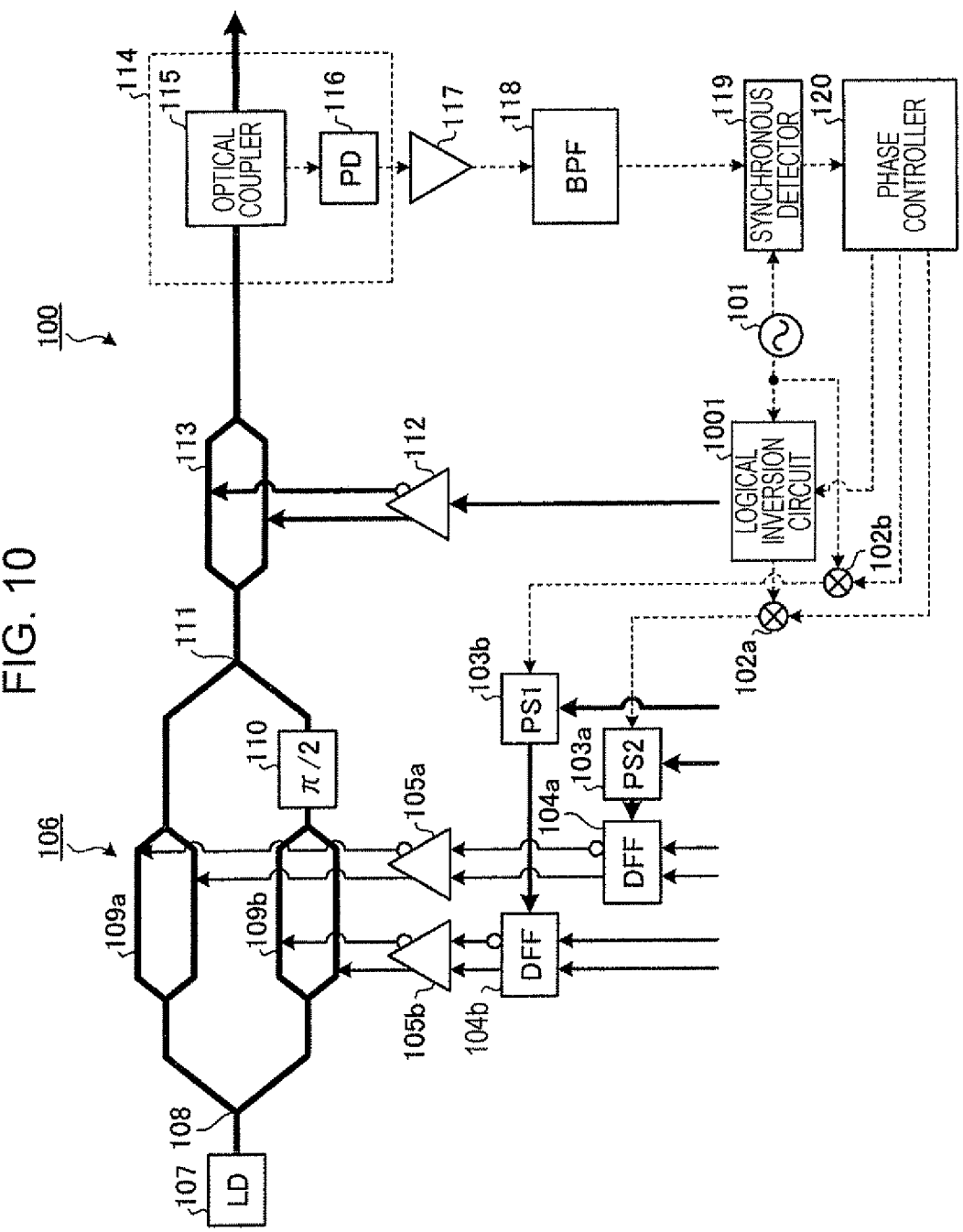
FIG. 10 is a block diagram illustrating an example of a configuration of an optical modulation apparatus.

FIG. 10 is a diagram illustrating an example of a configuration of the optical modulation apparatus 100. The same reference numerals are used in FIG. 10 to identify the same components illustrated in FIG. 1. A description of such components is omitted herein. The optical modulation apparatus 100 according to an embodiment of the present invention adjusts the difference in phase between the I and Q arms and the difference in phase between the data and clock signals in a time division manner. The optical modulation apparatus 100 includes a logical inversion circuit 1001, in addition to the components of the optical modulation apparatus 100 according to an embodiment of the present invention. The inverter 101c in the oscillator circuit 101 described above according to the embodiment of the present invention described above is not provided in the optical modulation apparatus 100 according to another embodiment of the present invention. As in an embodiment, the BPF 118 may not be provided in the optical modulation apparatus 100 illustrated in FIG. 10.

The oscillator circuit 101 supplies low-frequency signals to the multiplier circuit 102b and the logical inversion circuit 1001. The logical inversion circuit 1001 inverts the low-frequency signal supplied from the oscillator circuit 101 or does not invert the low-frequency signal supplied therefrom and supplies the low-frequency signal to the multiplier circuit 102a. The switching between the inversion of the low-frequency signal and the non-inversion of the low-frequency signal in the logical inversion circuit 1001 is controlled by the phase controller 120. For example, the phase controller 120 controls the logical inversion circuit 1001 so as not to invert the low-frequency signal to be supplied from the logical inversion circuit 1001 to the multiplier circuit 102a.

Figure 11A:
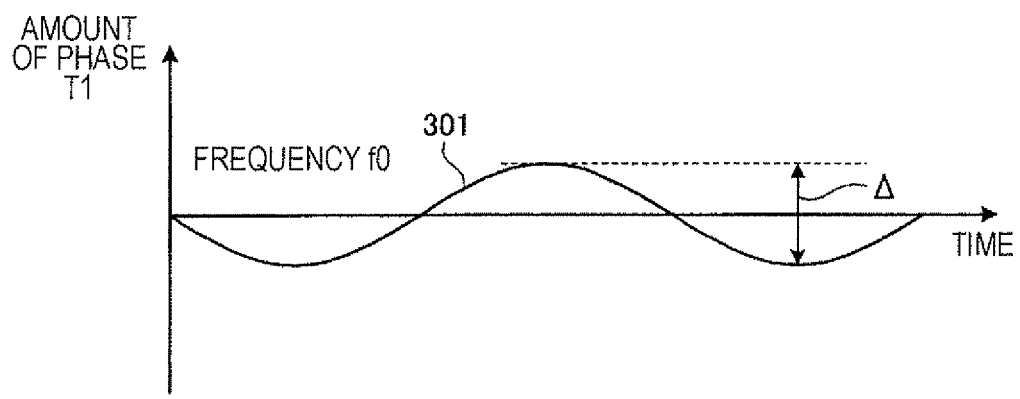
FIG. 11A is a graph illustrating an exemplary variation of an amount of phase of a clock signal output from a phase shifter.
Figure 11B:
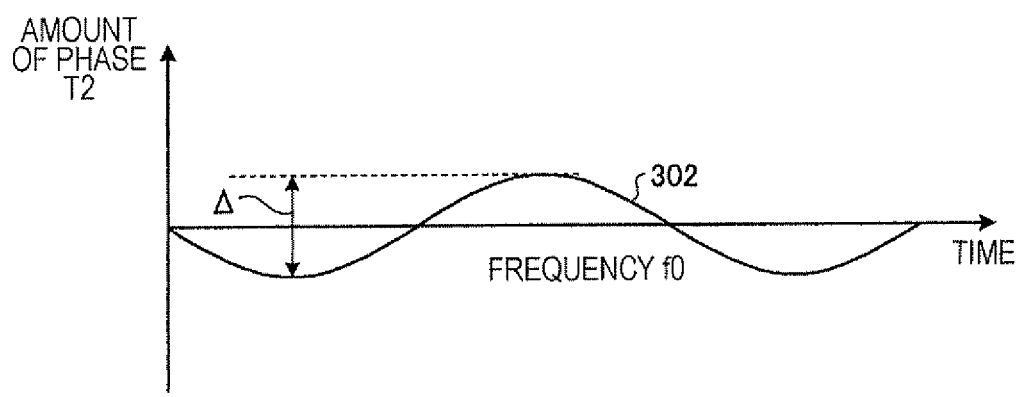
FIG. 11B is a graph illustrating an exemplary variation of an amount of phase of a clock signal output from another phase shifter.

FIG. 11A is a graph illustrating an exemplary variation of an amount of phase of a clock signal output from the phase shifter 103a. FIG. 11B is a graph illustrating an exemplary variation of an amount of phase of a clock signal output from the phase shifter 103b. A description of the reference numerals illustrated in FIGS. 3A and 3B is omitted in FIGS. 11A and 11B.

When the logical inversion circuit 1001 does not invert the low-frequency signal to be supplied to the multiplier circuit 102a, the amount of phase of the clock signal 301 output from the phase shifter 103a and the amount of phase of the clock signal 302 output from the phase shifter 103b are varied at the frequency f0, as illustrated in FIGS. 11A and 11B. The clock signal 301 is in phase with the clock signal 302, and the variation in the amount of phase of the clock signal 301 is constantly identical to that of the clock signal 302.

Figure 12A:
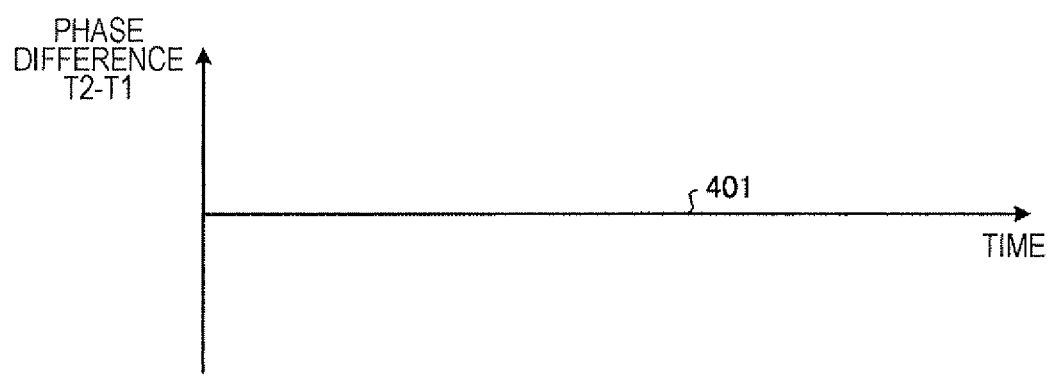
FIG. 12A is a graph illustrating an exemplary variation of a difference in phase between I and Q arms.

FIG. 12A is a graph illustrating an exemplary variation of a difference in phase between the I and Q arms. Referring to FIG. 12A, the horizontal axis represents time and the vertical axis represents the difference in phase between the I and Q arms. When the clock signal 301 is in phase with the clock signal 302 as in the examples illustrated in FIGS. 11A and 11B, the amount of phase of the clock signal 301 is offset by the amount of phase of the clock signal 302. Accordingly, the difference 401 in phase between the I and Q arms is constantly equal to zero, as illustrated in FIG. 12A.

Figure 12B:
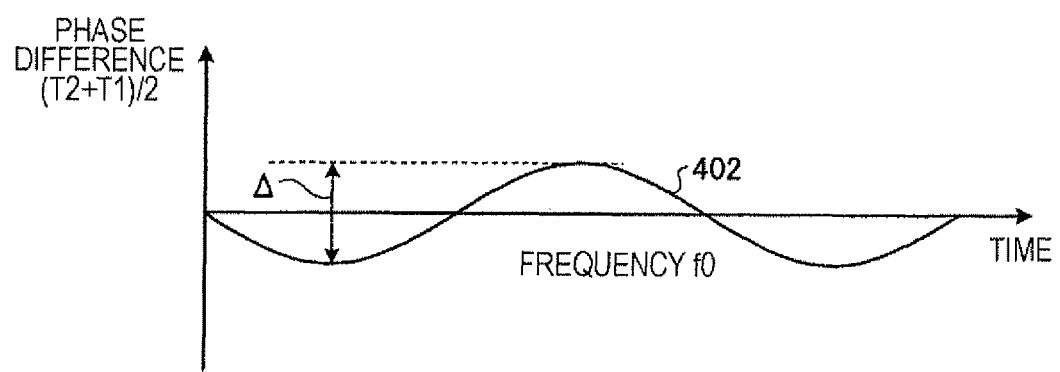
FIG. 12B is a graph illustrating an exemplary variation of a difference in phase between data and clock signals.

FIG. 12B is a graph illustrating an exemplary variation of a difference in phase between data and clock signals. Referring to FIG. 12B, the horizontal axis represents time and the vertical axis represents the difference in phase between the data and clock signals. When the clock signal 301 is in phase with the clock signal 302 as in the examples illustrated in FIGS. 11A and 11B, the difference 402 in phase between the data and clock signals is varied at the frequency f0, as illustrated in FIG. 12B.

When the logical inversion circuit 1001 does not invert the low-frequency signal to be supplied to the multiplier circuit 102a, it is possible to vary the difference 402 in phase between the data and clock signals at the frequency f0 without having to vary the difference 401 in phase between the I and Q arms, as illustrated in FIGS. 12A and 12B. Accordingly, the phase controller 120 can compensate for the difference 402 in phase between the data and clock signals.

After compensating for the difference 402 in phase between the data and clock signals, the phase controller 120 controls the logical inversion circuit 1001 so as to invert the low-frequency signal to be supplied from the logical inversion circuit 1001 to the multiplier circuit 102a. In this case, as described above with reference to FIGS. 3A to 4B, it is possible to vary the difference 401 in phase between the I and Q arms at the frequency f0 without having to vary the difference 402 in phase between the data and clock signals. Accordingly, the phase controller 120 can compensate for the difference 401 in phase between the I and Q arms.

As described above, in the optical modulation apparatus 100 according to an embodiment of the present invention, the phase controller 120 controls the logical inversion circuit 1001 so as not to invert the low-frequency signal to be supplied from the logical inversion circuit 1001 to the multiplier circuit 102a to vary the difference 402 in phase between the data and clock signals at the frequency f0 without having to vary the difference 401 in phase between the I and Q arms.

In addition, in the optical modulation apparatus 100 according to an embodiment of the present invention, the phase controller 120 controls the logical inversion circuit 1001 so as to invert the low-frequency signal to be supplied from the logical inversion circuit 1001 to the multiplier circuit 102a to vary the difference 401 in phase between the I and Q arms at the frequency f0 without having to vary the difference 402 in phase between the data and clock signals. Consequently, with the optical modulation apparatus 100 according to an embodiment of the present invention, it is possible to compensate for the difference in phase between the I and Q arms and the difference in phase between the data and clock signals in a time division manner.

The phase shifter 602 provided in the optical modulation apparatus 100 according to one embodiment of the present invention may not provided in the optical modulation apparatus 100 according to another embodiment of the present invention. The phase shifter 602 may be a high-speed phase shifter supporting 20 GHz whereas the logical inversion circuit 1001 provided in the optical modulation apparatus 100 according to an embodiment of the present invention may be a low-speed circuit supporting low-frequency signals. Accordingly, with the optical modulation apparatus 100 according to an embodiment of the present invention, it is possible to reduce the cost of the entire apparatus while improving the transmission performance of the optical transmission system by compensating for the difference in phase between the I and Q arms and the difference in phase between the data and clock signals in a time division manner.

FIG. 13 is a diagram illustrating an example of a configuration of the optical modulation apparatus 100. The same reference numerals are used in FIG. 13 to identify the same components illustrated in FIG. 1 or FIG. 6. A description of such components is omitted herein. The optical modulation apparatus 100 according to an embodiment of the present invention adjusts the difference 401 in phase between the I and Q arms and the difference 402 in phase between the data and clock signals in a time division manner or concurrently.

Referring to FIG. 13, the optical modulation apparatus 100 according to an embodiment of the present invention includes oscillator circuits 1301a and 1301b, BPFs 1302a and 1302b, synchronous detectors 1303a and 1303b, phase controllers 1304a and 1304b, a multiplier circuit 6011 and a phase shifter (PS3) 602, instead of the oscillator circuit 101, the BPF 118, the synchronous detector 119, and the phase controller 120 provided in the optical modulation apparatus 100 according to the embodiment of the present invention described above.

The oscillator circuit 1301a generates low-frequency signals and supplies the generated low-frequency signals to the phase shifters 103a and 103b through the multiplier circuits 102a and 102b, respectively. The oscillator circuit 1301a also supplies the low-frequency signal to the synchronous detector 1303a. The oscillator circuit 1301a includes the inverter 101c. The inverter 101c inverts the low-frequency signal to be supplied to the multiplier circuit 102b.

The oscillator circuit 1301b generates low-frequency signals and supplies the generated low-frequency signal to the phase shifter 602 through the multiplier circuit 601. The oscillator circuit 1301b also supplies the low-frequency signal to the synchronous detector 1303b. The oscillator circuit 1301a generates the low-frequency signals having a frequency f1 and the oscillator circuit 1301*b* generates the low-frequency signals having a frequency f0 (≠f1).

The TIA 117 appropriately amplifies the monitor signal supplied from the monitoring unit 114 and supplies the amplified signal to the BPF 1302*a* and 1302*b*. The BPF 1302*a* extracts a component having a frequency around (substantially equal to) the frequency f1 from the monitor signal supplied from the TIA 117. The BPF 1302*a* supplies the extracted component in the monitor signal to the synchronous detector 1303*a*.

The BPF 1302*b* extracts a component having a frequency around the frequency f0 from the monitor signal supplied from the TIA 117. The BPF 1302*b* supplies the extracted component in the monitor signal to the synchronous detector 1303*b*. The BPFs 1302*a* and 1302*b* may not be provided in the optical modulation apparatus 100 illustrated in FIG. 13.

The synchronous detector 1303*a* performs the synchronous detection based on the low-frequency signal supplied from the oscillator circuit 1301*a* and the monitor signal supplied from the BPF 1302*a* to extract a component having the frequency f1, which is the frequency of the low-frequency signal, from the monitor signal supplied from the BPF 1302*a*. The synchronous detector 1303*a* supplies the extracted component having the frequency f1 in the monitor signal to the phase controller 1304*a*.

The synchronous detector 1303*b* performs the synchronous detection based on the low-frequency signal supplied from the oscillator circuit 1301*b* and the monitor signal supplied from the BPF 1302*b* to extract a component having the frequency f0, which is the frequency of the low-frequency signal, from the monitor signal supplied from the BPF 1302*b*. The synchronous detector 1303*b* supplies the extracted component having the frequency f0 in the monitor signal to the phase controller 1304*b*.

The phase controller 1304*a* controls adjustment of the difference in phase caused by the phase shifter 103*a* and the phase shifter 103*b* based on the component having the frequency f1 in the monitor signal, supplied from the synchronous detector 1303*a*. Specifically, the phase controller 1304*a* controls at least one of the phase shifter 103*a* and the phase shifter 103*b* so as to minimize the strength of the component having the frequency f1 in the monitor signal supplied from the BPF 1302*a* or so as to yield a value near zero in the synchronous detection in the synchronous detector 1303*a*. The phase controller 1304*a* supplies the control signals used for controlling the phase shifters 103*a* and 103*b* to the phase shifters 103*a* and 103*b* through the multiplier circuits 102*a* and 102*b*, respectively.

The phase controller 1304*b* controls adjustment of the difference in phase caused by the phase shifter 602 based on the component having the frequency f0 in the monitor signal, supplied from the synchronous detector 1303*b*. Specifically, the phase controller 1304*b* controls the phase shifter 602 so as to minimize the strength of the component having the frequency f0 in the monitor signal supplied from the BPF 1302*b* or so as to yield a value near zero in the synchronous detection in the synchronous detector 1303*b*. The phase controller 1304*b* supplies the control signal used for controlling the phase shifter 602 to the phase shifter 602 through the multiplier circuit 601. The phase controller 1304*a* may be integrated with the phase controller 1304*b*.

Figure 14A:
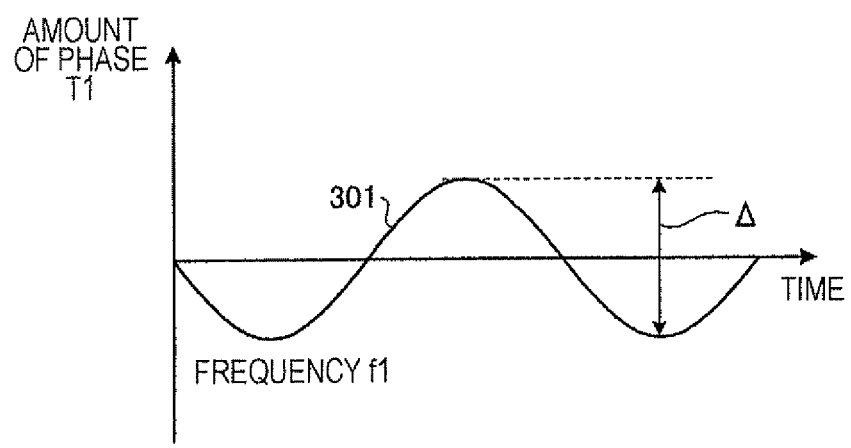
FIG. 14A is a graph illustrating an exemplary variation of an amount of phase of a clock signal output from a phase shifter.
Figure 14B:
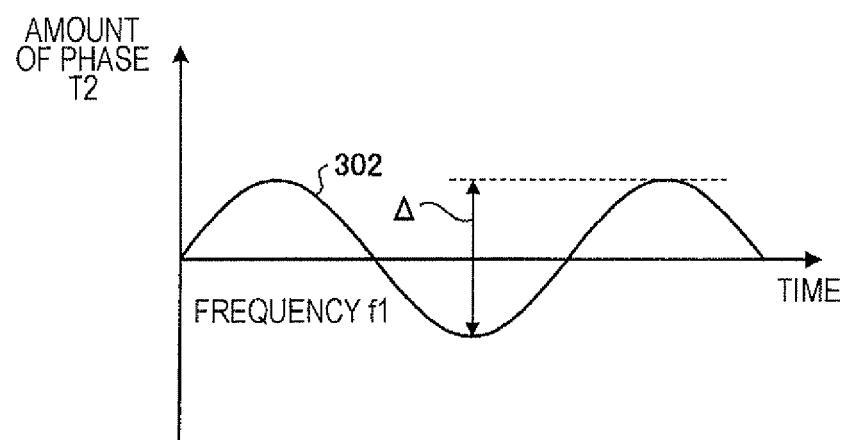
FIG. 14B is a graph illustrating an exemplary variation of an amount of phase of a clock signal output from another phase shifter.
Figure 14C:
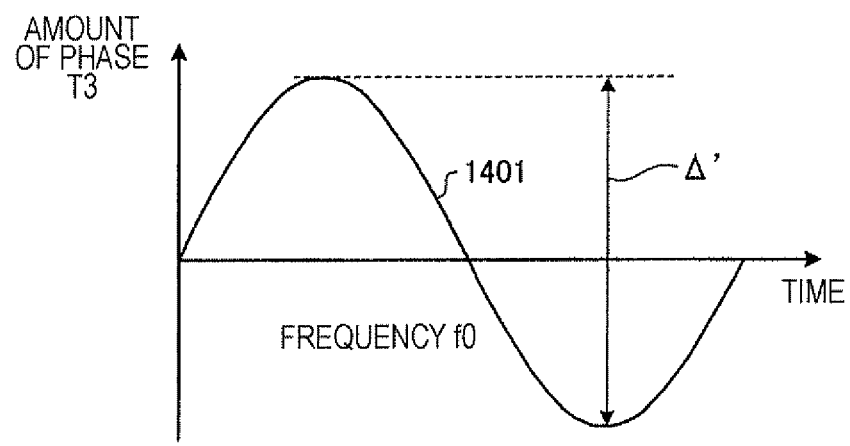
FIG. 14C is a graph illustrating an exemplary variation of an amount of phase of a clock signal output from another phase shifter.

FIG. 14A is a graph illustrating an exemplary variation in an amount of phase of a clock signal output from the phase shifter 103*a*. FIG. 14B is a graph illustrating an exemplary variation in an amount of phase of a clock signal output from the phase shifter 103*b*. FIG. 14C is a graph illustrating an exemplary variation in an amount of phase of a clock signal output from the phase shifter 602.

The horizontal axes in FIGS. 14A to 14C represent time. The vertical axis in FIG. 14A represents an amount T1 of phase of the clock signal caused by the phase shifter 103*a*. The vertical axis in FIG. 14B represents an amount T2 of phase of the clock signal caused by the phase shifter 103*b*. The vertical axis in FIG. 14C represents an amount T3 of phase of the clock signal caused by the phase shifter 602.

As described above, the oscillator circuit 1301*a* generates the low-frequency signals and the phase shifters 103*a* and 103*b* vary the amounts of phase of the clock signals at the frequency f1 based on the low-frequency signals. Accordingly, as illustrated in FIGS. 14A and 14B, the amount of phase of a clock signal 301 output from the phase shifter 103*a* and the amount of phase of a clock signal 302 output from the phase shifter 103*b* are varied at the frequency f1.

Since one of the low-frequency signals output from the oscillator circuit 1301*a* is inverted relative to the other thereof, the amount of phase of the clock signal 301 is shifted from the amount of phase of the clock signal 302 by 180°. The amplitudes of the variations of the amounts of phase of the clock signals 301 and 302 are denoted by "Δ".

The oscillator circuit 1301*b* generates the low-frequency signal and the phase shifter 602 varies the amount of phase of the clock signal at the frequency f0 based on the low-frequency signal. Accordingly, as illustrated in FIG. 14C, the amount of phase of a clock signal 1401 output from the phase shifter 602 is varied at the frequency f0 (≠f1). The amplitude of the variation of the amount of phase of the clock signal 1401 is denoted by "Δ'".

Figure 15A:
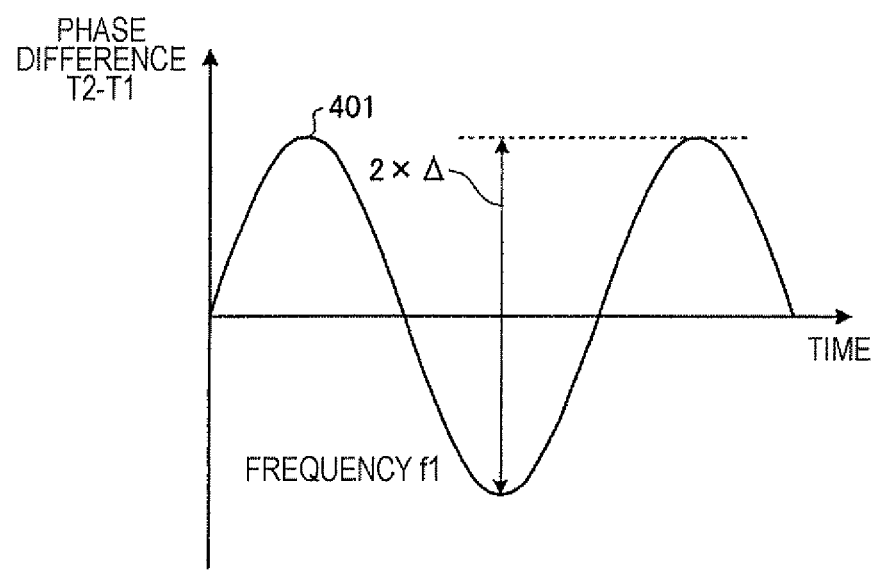
FIG. 15A is a graph illustrating an exemplary variation of a difference in phase between I and Q arms.

FIG. 15A is a graph illustrating an exemplary variation of a difference in phase between the I and Q arms according to an embodiment of the present invention. Referring to FIG. 15A, the horizontal axis represents time and the vertical axis represents the difference in phase between the I and Q arms. A difference 401 in phase between the I and Q arms corresponds to a difference "T2−T1" in the amount of phase between the clock signals 301 and 302. As illustrated in FIGS. 14A and 14B, the amount of phase of the clock signal 301 is shifted from the amount of phase of the clock signal 302 by 180°. Accordingly, as illustrated in FIG. 15A, the difference 401 in phase between the I and Q arms is varied at the frequency f1 and have an amplitude "2×Δ".

Figure 15B:
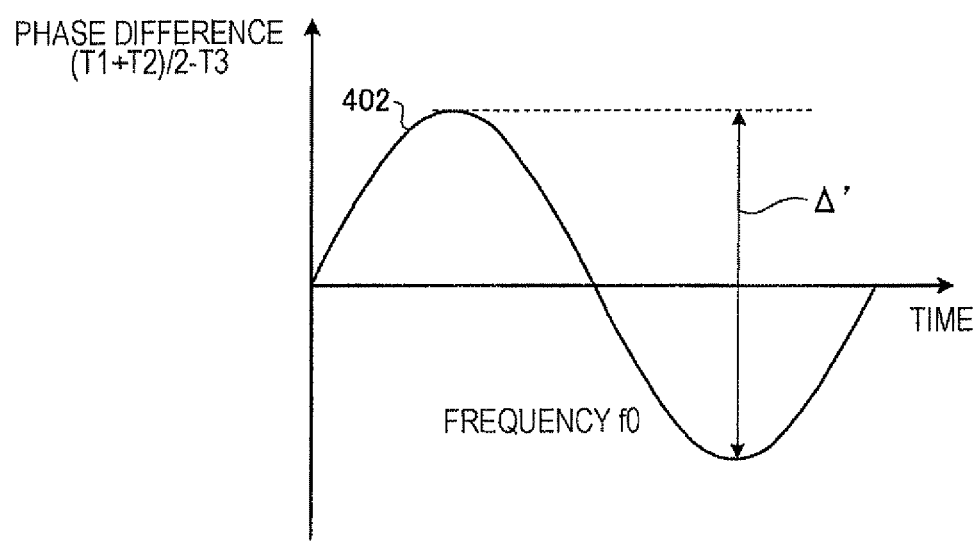
FIG. 15B is a graph illustrating an exemplary variation of a difference in phase between data and clock signals.

FIG. 15B is a graph illustrating an exemplary variation of a difference in phase between the data and clock signals. Referring to FIG. 15B, the horizontal axis represents time and the vertical axis represents the difference in phase between the data and clock signals. A difference 402 in phase between the data and clock signals corresponds to the difference between the average of the amounts of phase of the clock signals 301 and 302 and the amount T3 of phase of the clock signal 1401.

As illustrated in FIGS. 14A and 14B, since the amount of phase of the clock signal 301 is shifted from the amount of phase of the clock signal 302 by 180°, the amount of phase of the clock signal 301 is offset by the amount of phase of the clock signal 302. Accordingly, the difference 402 in phase between the data and clock signals is varied depending on the amount T3 of phase of the clock signal 1401. Consequently, the difference 402 in phase between the data and clock signals is varied at the frequency f0 and has the amplitude Δ', as illustrated in FIG. 15B.

As illustrated in FIGS. 15A and 15B, the difference 401 in phase between the I and Q arms is varied at the frequency f1, which is the frequency of the low-frequency signals supplied from the oscillator circuit 1301*a* to the phase shifters 103*a* and 103*b*, and the difference 402 in phase between the data and clock signals is varied at the frequency f0, which is the frequency of the low-frequency signal supplied from the oscillator circuit 1301b to the phase shifter 602.

Accordingly, the synchronous detector 1303a can extract the component having the frequency f1 in the monitor signal and the synchronous detector 1303b can extract the component having the frequency f0 in the monitor signal. As a result, the phase controllers 1304a and 1304b can concurrently adjust the difference 401 in phase between the I and Q arms and the difference 402 in phase between the data and clock signals, respectively.

Figure 16A:
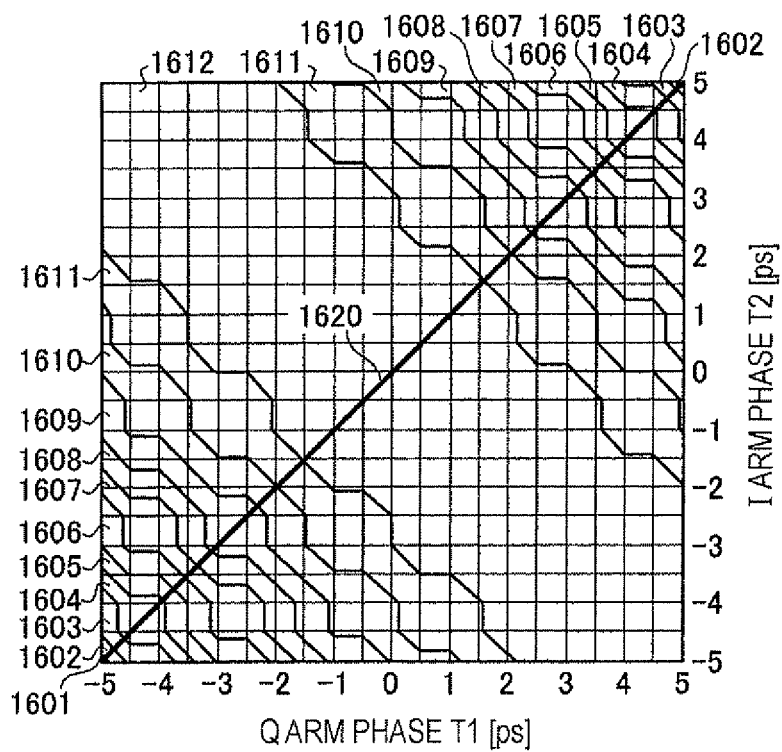
FIG. 16A is a graph illustrating an example of an intensity of a component having a frequency f0 in a monitor signal supplied from a BPF, in compensation of a difference in phase between data and clock signals.

FIG. 16A is a graph illustrating an example of a strength of a component having the frequency f0 in the monitor signal supplied from the BPF 1302b, in compensation of a difference in phase between the data and clock signals according to an embodiment of the present invention. FIG. 16A shows the intensity of the component having the frequency f0 in the monitor signal when the phase controllers 1304a and 1304b set the amount of phase in the phase shifter 602 to zero and vary the amounts of phase in the phase shifters 103a and 103b. Referring to FIG. 16A, the horizontal axis represents the phase T1 of the Q arm, that is, the amount of phase in the phase shifter 103a under the control of the phase controller 1304a and the vertical axis represents the phase T2 of the I arm, that is, the amount of phase in the phase shifter 103b under the control of the phase controller 1304a (the same applies to FIG. 17A).

Referring to FIG. 16A, the component having the frequency f0 in the monitor signal has an intensity of 1.1E-13-1.2E-13 a.u. in an area 1601, the component having the frequency f0 in the monitor signal has an intensity of 1E-13-1.1E-13 a.u. in an area 1602, the component having the frequency f0 in the monitor signal has an intensity of 9E-14-1E-13 a.u. in an area 1603, the component having the frequency f0 in the monitor signal has an intensity of 8E-14-9E-14 a.u. in an area 1604, the component having the frequency f0 in the monitor signal has an intensity of 7E-14-8E-14 a.u. in an area 1605, the component having the frequency f0 in the monitor signal has an intensity of 6E-14-7E-14 a.u. in an area 1606, the component having the frequency f0 in the monitor signal has an intensity of 5E-14-5E-14 a.u. in an area 1607, the component having the frequency f0 in the monitor signal has an intensity of 4E-14-5E-14 a.u. in an area 1608, the component having the frequency f0 in the monitor signal has an intensity of 3E-14-4E-14 a.u. in an area 1609, the component having the frequency f0 in the monitor signal has an intensity of 2E-14-3E-14 a.u. in an area 1610, the component having the frequency f0 in the monitor signal has an intensity of 1E-14-2E-14 a.u. in an area 1611, and the component having the frequency f0 in the monitor signal has an intensity of 0-1E-14 a.u. in an area 1612. A straight line 1620 indicates the dependency on the difference in phase between the data and clock signals when the difference T2−T1 in phase between I and Q arms is set to zero.

Figure 16B:
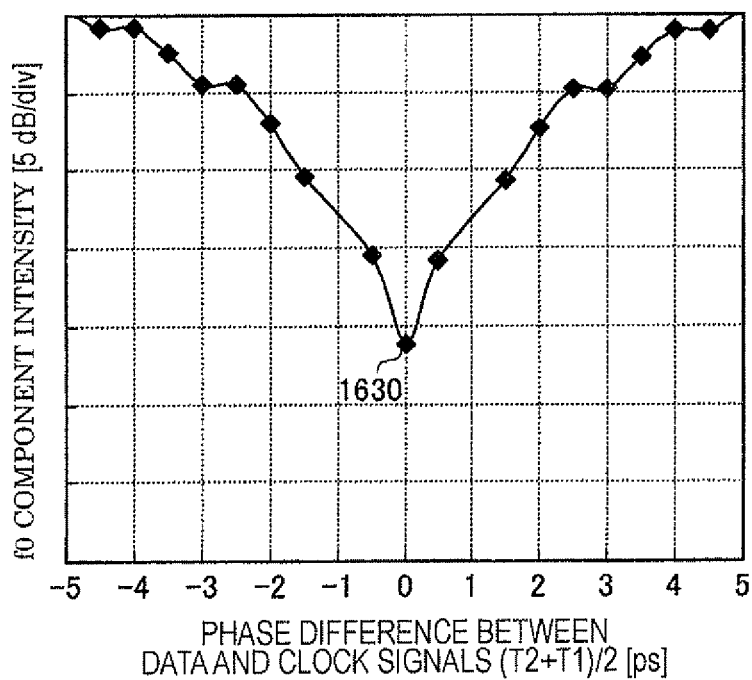
FIG. 16B is a graph illustrating a relationship between a difference in phase between a data and clock signals and an intensity of a component having a frequency f0 in a monitor signal supplied from the BPF.

FIG. 16B is a graph illustrating a relationship between a difference in phase between data and clock signals and an intensity of a component having the frequency f0 in the monitor signal supplied from the BPF 1302b according to an embodiment of the present invention. FIG. 16B shows the characteristics resulting from extraction of the straight line 1620 in FIG. 16A. As illustrated in FIG. 16B, the difference in phase between the data and clock signals becomes zero at a point 1630 where the component having the frequency f0 in the monitor signal has the minimum strength. Accordingly, the phase controllers 1304a and 1304b control at least one of the phase shifters 103a, the phase shifter 103b, and the phase shifter 602 so as to minimize the intensity of the component having the frequency f0 in the monitor signal, thereby optimizing the difference in phase between the data and clock signals.

Figure 17A:
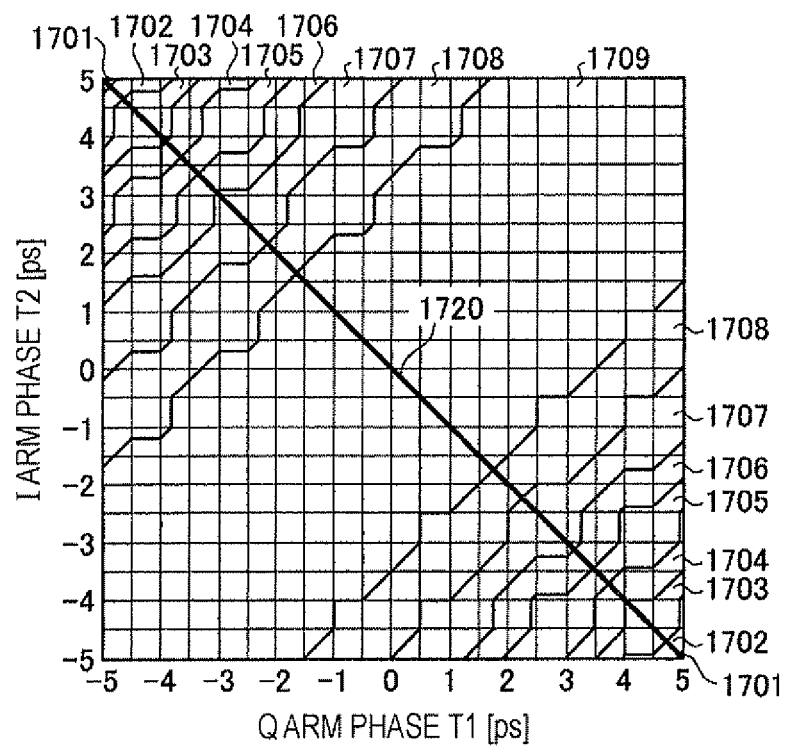
FIG. 17A is a graph illustrating an example of an intensity of a component having the frequency f1 in a monitor signal supplied from a BPF, in compensation of a difference in phase between the I and Q arms.

FIG. 17A is a graph illustrating an example of an intensity of a component having the frequency f1 in the monitor signal supplied from the BPF 1302a, in compensation of a difference in phase between the I and Q arms according to an embodiment of the present invention. Referring to FIG. 17A, the component having the frequency f1 in the monitor signal has an intensity of 8E-11-9E-11 a.u. in an area 1701, the component having the frequency f1 in the monitor signal has an intensity of 7E-11-8E-11 a.u. in an area 1702, the component having the frequency f1 in the monitor signal has an intensity of 6E-11-7E-11 a.u. in an area 1703, the component having the frequency f1 in the monitor signal has an intensity of 5E-11-6E-11 a.u. in an area 1704, the component having the frequency f1 in the monitor signal has an intensity of 4E-11-5E-11 a.u. in an area 1705, the component having the frequency f1 in the monitor signal has an intensity of 3E-11-4E-11 a.u. in an area 1706, the component having the frequency f1 in the monitor signal has an intensity of 2E-11-3E-11 a.u. in an area 1707, the component having the frequency f1 in the monitor signal has an intensity of 1E-11-2E-11 a.u. in an area 1708, and the component having the frequency f1 in the monitor signal has an intensity of 0-1E-11 a.u. in an area 1709. A straight line 1720 indicates the dependency on the difference in phase between the I and Q arms when the difference in phase between the data and clock signals is set to zero.

Figure 17B:
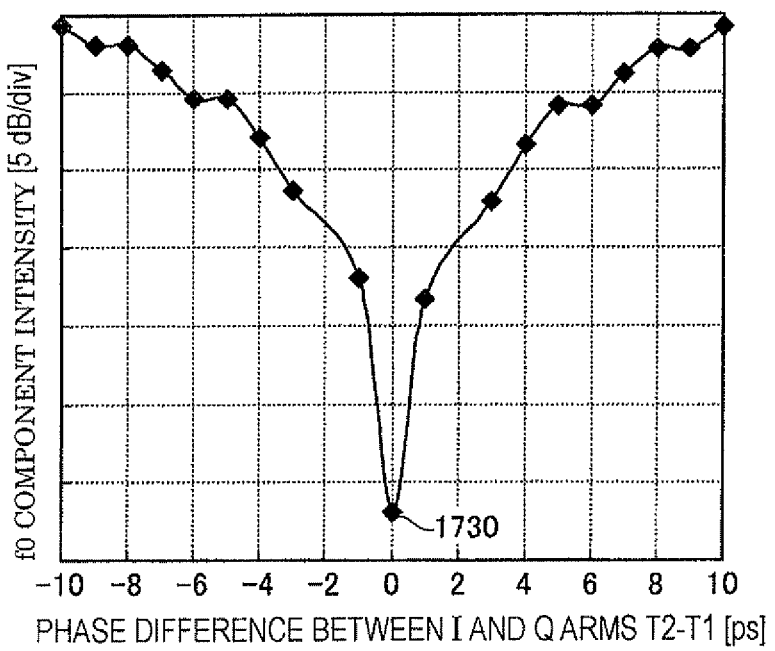
FIG. 17B is a graph illustrating the relationship between a difference in phase between the I and Q arms and an intensity of a component having the frequency f1 in a monitor signal supplied from the BPF n.

FIG. 17B is a graph illustrating a relationship between a difference in phase between the I and Q arms and an intensity of a component having the frequency f1 in a monitor signal supplied from the BPF 1302a according to an embodiment of the present invention. FIG. 17B shows the characteristics resulting from extraction of the straight line 1720 in FIG. 17A. As illustrated in FIG. 17B, the difference in phase between the I and Q arms becomes zero at a point 1730 where the component having the frequency f1 in the monitor signal has the minimum intensity. Accordingly, the phase controllers 1304a and 1304b control at least one of the phase shifters 103a, the phase shifter 103b, and the phase shifter 602 so as to minimize the intensity of the component having the frequency f1 in the monitor signal, thereby optimizing the difference in phase between the I and Q arms.

As described above, with the optical modulation apparatus 100 according to an embodiment of the present invention, the synchronous detector 1303a can extract the component having the frequency f1 in the monitor signal and the synchronous detector 1303b can extract the component having the frequency f0 in the monitor signal. Accordingly, it is possible to concurrently compensate for the difference 401 in phase between the I and Q arms and the difference 402 in phase between the data and clock signals to improve the transmission performance of the optical transmission system.

Although the synchronous detector 119, the synchronous detector 1303a, and the synchronous detector 1303b extract the component having the frequency f0 from the monitor signal supplied from the monitoring unit 114 in the above embodiments, the synchronous detector 119, the synchronous detector 1303a, and the synchronous detector 1303b may extract the component having the frequency f0 from the variation in the strength of the monitor signal supplied from the monitoring unit 114. In this case, for example, a power detector for monitoring the variation in the strength of the monitor signal is provided at a position to which the monitor signal is supplied from the TIA 117.

Figure 18:
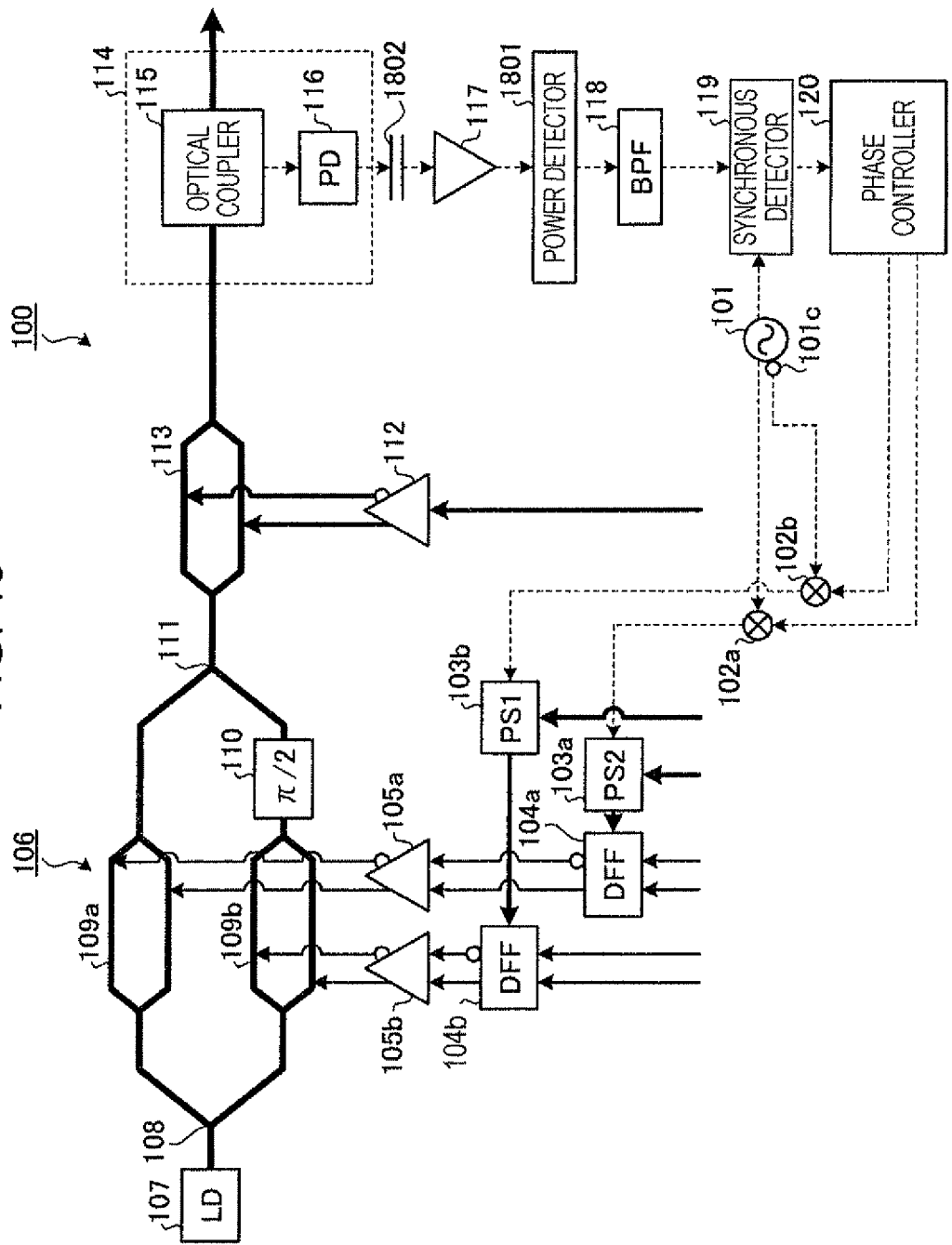
FIG. 18 is a diagram illustrating an example of a configuration of an optical modulation apparatus.

FIG. 18 is a diagram illustrating an example of a configuration of the optical modulation apparatus 100 according to a modification to an embodiment of the present invention described above. The same reference numerals are used in FIG. 18 to identify the same components illustrated in FIG. 1. A description of such components is omitted herein. The optical modulation apparatus 100 according to this embodiment includes a power detector 1801, in addition to the components of the optical modulation apparatus 100 according to the embodiment of the present invention described above. The TIA 117 appropriately amplifies the monitor signal supplied from the monitoring unit 114 and supplies the amplified monitor signal to the power detector 1801.

The power detector 1801 supplies an electrical signal corresponding to the variation in the power of the monitor signal supplied from the TIA 117 to the synchronous detector 119 through the BPF 118. The synchronous detector 119 extracts a component having the frequency f0 from the electrical signal supplied from the power detector 1801. A capacitor 1802 may be provided between the optical receiver 116 and the TIA 117. As in the embodiment described above, the BPF 118 may not be provided in the optical modulation apparatus 100 illustrated in FIG. 18.

Figure 19A:
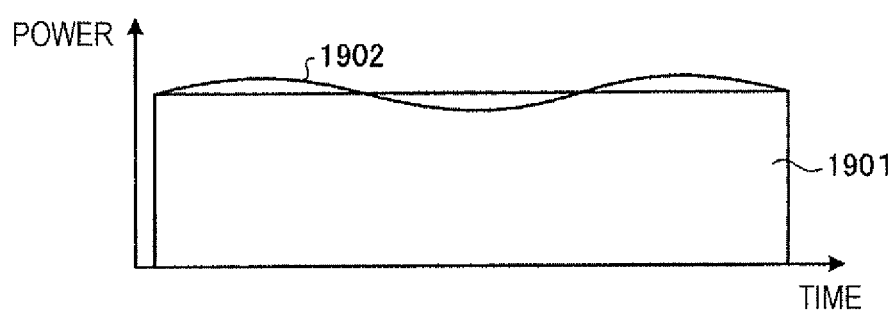
FIG. 19A is a graph illustrating an exemplary variation in a power of a monitor signal detected by a photodetector.
Figure 19B:
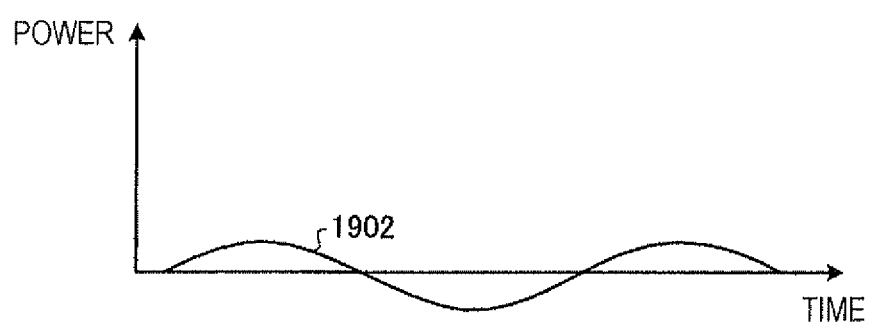
FIG. 19B is a graph illustrating an exemplary variation in a power of a monitor signal detected by a power detector.

FIG. 19A is a graph illustrating an exemplary variation in a power of a monitor signal detected by a photodetector. FIG. 19B is a graph illustrating an exemplary variation in a power of a monitor signal detected by a power detector. Referring to FIGS. 19A and 19B, the horizontal axis represents time and the vertical axis represents the power of the monitor signal.

As illustrated in FIG. 19A, the monitor signal detected by the optical receiver 116 includes a direct current (DC) component 1901 and an alternate current (AC) component 1902. The DC component 1901 corresponds to an average power of output(s) from the optical modulation apparatus 100. The AC component 1902 corresponds to variation in a power caused by superimposition of a low-frequency signal on a data signal. Since the AC component 1902 is smaller than the DC component 1901, the AC component 1902 is apt to be buried in the DC component 1901.

In contrast, in the optical modulation apparatus 100 in FIG. 18, for example, the capacitor 1802 may cut the DC component 1901 and the power detector 1801 may only detect the AC component 1902, as illustrated in FIG. 19B. Accordingly, it is possible to perform the sufficient synchronous detection even by using the low-speed PD as the optical receiver 116.

Although the phase modulation unit 106 performs the phase modulation to the lights supplied from the light source 107 and the RZ modulator 113 performs the RZ modulation to the signal resulting from the phase modulation in the phase modulation unit 106 in the above embodiments, the RZ modulator 113 may perform the RZ modulation to the lights supplied from the light source 107 and the phase modulation unit 106 may perform the phase modulation to the signal resulting from the RZ modulation in the RZ modulator 113.

Figure 20:
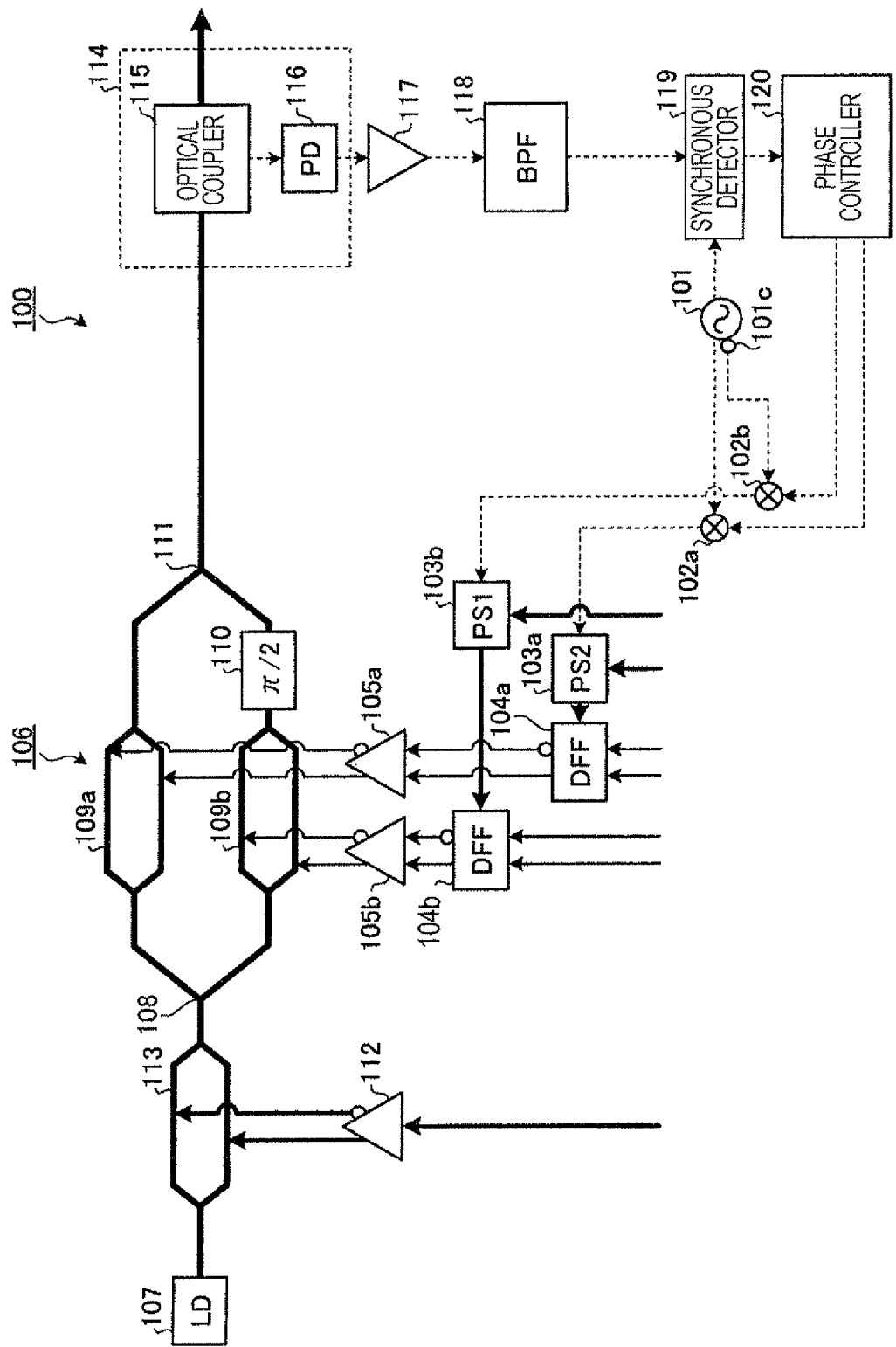
FIG. 20 is a diagram illustrating an example of a configuration of an optical modulation apparatus.

FIG. 20 is a diagram illustrating an example of a configuration of an optical modulation apparatus 100 according to another modification to an embodiment of the present invention described above. The same reference numerals are used in FIG. 20 to identify the same components illustrated in FIG. 1. A description of such components is omitted herein. Referring to FIG. 20, the RZ modulator 113 performs the RZ modulation to the lights supplied from the light source 107. The RZ modulator 113 supplies the signal resulting from the RZ modulation to the phase modulation unit 106. The divider part 108 divides the lights supplied from the RZ modulator 113. The optical multiplexer 111 supplies the multiplexed optical signal to the monitoring unit 114. As in the embodiment described above, the BPF 118 may not be provided in the optical modulation apparatus 100 illustrated in FIG. 20.

As described above, with the optical device and the optical modulation method according to the embodiments of the present invention, the phases of the two data signals can be varied at the frequency f0 to perform the feedback-control of the phases of the two data signals. In addition, the phase of the clock signal can be varied at the frequency f0 to perform the feedback-control of the phase of the clock signal.

Consequently, it is possible to precisely compensate for the difference in phase between the I and Q arms and the difference in phase between the data and clock signals caused by a variation in temperature and/or a variation with time. As a result, it is possible to compensate for an increase in the Q-factor penalty caused by a variation in temperature and/or a variation with time to improve the transmission performance of the optical transmission system.

According to the embodiments, the optical device uses the variation part to vary the phases of two data signals at a predetermined frequency. The optical device performs feedback-control of the phases of the two data signals based on the component which the extraction part extracted from the signal subjected to the phase modulation in the multi-level phase modulation part and which has the predetermined frequency. Accordingly, it is possible to precisely compensate for the difference in phase between the I and Q arms.

According to the embodiments, the optical device uses the variation part to vary the phase of a clock signal at a predetermined frequency. The optical device performs feedback-control of the phase of the clock signal based on a component which the extraction part extracted from the signal subjected to the return-to-zero modulation in the return-to-zero modulation part and which has the predetermined frequency. Accordingly, it is possible to precisely compensate for the difference in phase between the data and clock signals.

At least some of the disclosed operation(s) may be implemented via a computer using a program stored in a computer-readable recording medium. For example, monitoring of the optical signal may be executed via a computer-implemented monitoring unit.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An optical device comprising:
    a first variation section to vary phases of two data signals at a first predetermined frequency;
    a multi-level phase modulation section to perform a phase modulation of a light based on the two data signals whose phases are varied at the first predetermined frequency;
    a first extraction section to extract a component having the first predetermined frequency from an optical signal subjected to the phase modulation in the multi-level phase modulation section; and
    a first phase control section to control the phases of the two data signals based on the component extracted from the optical signal in the first extraction section.

2. The optical device according to claim 1, wherein the first variation section includes:
    an oscillator circuit to generate at least one signal having the first predetermined frequency; and
    first and second phase shifters to vary the phases of the two data signals based on the at least one signal having the first predetermined frequency.

3. The optical device according to claim 2, comprising:
a first inverter section to invert one of signals that have the first predetermined frequency that are generated by the oscillator circuit and are supplied to the first and second phase shifters.

4. The optical device according to claim 2, wherein the first extraction section extracts a component having the first predetermined frequency based on the at least one signal having the first predetermined frequency supplied from the oscillator circuit.

5. The optical device according to claim 2, comprising:
a third phase shifter to vary a phase of a clock signal based on the at least one signal having the first predetermined frequency; and
a return-to-zero modulation section to perform a return-to-zero modulation based on the clock signal whose phase is varied at the first predetermined frequency, and
wherein the first extraction section extracts a component having the first predetermined frequency from a signal subjected to the return-to-zero modulation in the return-to-zero modulation section, and
wherein the first phase control section controls the phase of the clock signal based on the component extracted from the signal by the first extraction section.

6. The optical device according to claim 5, wherein the first phase control section controls the phases of the two data signals and the phase of the clock signal in a time division manner.

7. The optical device according to claim 2, comprising:
a return-to-zero modulation section to perform a return-to-zero modulation based on a clock signal; and
a second inverter section to switch between inversion or non-inversion of one of signals that have the first predetermined frequency that are generated by the oscillator circuit and supplied to the first and second phase shifters.

8. The optical device according to claim 7, wherein the first phase control section controls the switching between the inversion and non-inversion of the signal in the second inverter section in a time division manner.

9. The optical device according to claim 1, comprising:
a second variation section to vary a phase of a clock signal at a second predetermined frequency different from the first predetermined frequency;
a return-to-zero modulation section to perform a return-to-zero modulation based on the clock signal whose phase is varied at the second predetermined frequency;
a second extraction section to extract a component having the second predetermined frequency from a signal subjected to the return-to-zero modulation in the return-to-zero modulation section; and
a second phase control section to control the phase of the clock signal based on the component extracted from the signal by the second extraction section.

10. The optical device according to any of claim 1, wherein the multi-level phase modulation section is a Differential Quadrature Phase Shift Keying modulator including two Mach-Zehnder interferometers, and
wherein the two Mach-Zehnder interferometers each perform binary phase modulation based on the two data signals.

11. The optical device according to claim 1, wherein the first phase control section controls amounts of delay of the two data signals so that the component extracted from the signal by the first extraction section has a value near zero.

12. The optical device according to claim 1, wherein the multi-level phase modulation section is a Mach-Zehnder interferometer having a multimode interference coupler at an output portion, and
wherein the first extraction section extracts a component having the first predetermined frequency from a signal output from one end of the multimode interference coupler.

13. The optical device according to claim 5, wherein the return-to-zero modulation section is a Mach-Zehnder interferometer having a multimode interference coupler at an output portion, and
wherein the first extraction section extracts a component having the first predetermined frequency from a signal output from one end of the multimode interference coupler.

14. The optical device according to claim 1, wherein the first extraction section includes
a divider section to divide a section of the signal subjected to the phase modulation in the multi-level phase modulation section;
a light receiving section to receive the section of the signal divided by the divider section and to convert the received signal into an electrical signal; and
a synchronous detection section to perform a synchronous detection to the electrical signal resulting from conversion in the light receiving section based on the first predetermined frequency.

15. The optical device according to claim 14, comprising:
a filter section to extract a component having a frequency within a determined range of the first predetermined frequency from the electrical signal resulting from the conversion in the light receiving section, and
wherein the synchronous detection section performs the synchronous detection to the component extracted by the filter section.

16. The optical device according to claim 14, comprising:
a detection section to detect a variation in an power of the electrical signal resulting from the conversion in the light receiving section, and
wherein the synchronous detection section performs the synchronous detection to the signal corresponding to the variation in the power of the electrical signal detected by the detection section.

17. An optical device comprising:
a multi-level phase modulation section to perform a phase modulation of a light based on two data signals, the multi-level phase modulation section including a plurality of modulators arranged in a parallel configuration;
a variation section to vary a phase of a clock signal at a predetermined frequency;
a return-to-zero modulation section to perform a return-to-zero modulation based on the clock signal whose phase is varied at the predetermined frequency;
an extraction section to extract a component having the predetermined frequency from a signal subjected to the return-to-zero modulation in the return-to-zero modulation section; and
a phase control section to control the phase of the clock signal based on the component extracted from the signal by the extraction section.

18. An optical modulation method comprising:
varying phases of two data signals at a predetermined frequency;
performing a phase modulation of a light based on the two data signals whose phases are varied at the predetermined frequency;

extracting a component having the predetermined frequency from a signal subjected to the phase modulation; and controlling the phases of the two data signals based on the component extracted from the signal.

19. An optical modulation method comprising:

performing a phase modulation of a light based on two data signals by a multi-level phase modulator including a plurality of modulators arranged in a parallel configuration;

varying a phase of a clock signal at a predetermined frequency;

performing a return-to-zero modulation based on the clock signal whose phase is varied at the predetermined frequency;

extracting a component having the predetermined frequency from a signal subjected to the return-to-zero modulation; and controlling the phase of the clock signal based on the component extracted from the signal.

20. An optical device, comprising:

a variable phase shifter to vary phases of two data signals at a predetermined frequency;

a multi-level modulator to modulate a phase modulation of a light based on the two data signals whose phases are varied at the predetermined frequency;

a filter to extract a component having the predetermined frequency from an optical signal subjected to the phase modulation in the multi-level phase modulator; and a phase controller to control the phases of the two data signals based on the component extracted from the optical signal in the filter.

* * * * *

UNITED STATES PATENT AND TRADEMARK OFFICE
CERTIFICATE OF CORRECTION

PATENT NO. : 8,582,980 B2  
APPLICATION NO. : 12/013708  
DATED : November 12, 2013  
INVENTOR(S) : Masato Nishihara et al.

Page 1 of 1

It is certified that error appears in the above-identified patent and that said Letters Patent is hereby corrected as shown below:

In the Claims

In Column 21, Line 57, In Claim 10, delete "any of claim" and insert -- claim --, therefor.

Signed and Sealed this  
Twenty-fifth Day of March, 2014

Michelle K. Lee  
*Deputy Director of the United States Patent and Trademark Office*